United States Patent
Tanabe

(10) Patent No.: US 9,178,360 B2
(45) Date of Patent: Nov. 3, 2015

(54) POWER SUPPLY APPARATUS, METHOD, AND STORAGE MEDIUM TO OUTPUT WIRELESS POWER, DETECT VALUE RELATING TO OUTPUT POWER, AND CHARGE BASED ON DETECTED VALUE

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 13/398,130

(22) Filed: Feb. 16, 2012

(65) Prior Publication Data
US 2012/0212070 A1    Aug. 23, 2012

(30) Foreign Application Priority Data
Feb. 22, 2011    (JP) ................. 2011-036024

(51) Int. Cl.
*H02J 5/00*    (2006.01)
(52) U.S. Cl.
CPC ..................... *H02J 5/005* (2013.01)
(58) Field of Classification Search
USPC .......................................... 307/104
See application file for complete search history.

(56) References Cited

U.S. PATENT DOCUMENTS

| 7,024,232 | B2 | 4/2006 | Ponce De Leon et al. | |
| 2003/0076168 | A1* | 4/2003 | Forrester | 330/129 |
| 2009/0127936 | A1 | 5/2009 | Kamijo et al. | |
| 2009/0133942 | A1* | 5/2009 | Iisaka et al. | 178/43 |
| 2009/0224723 | A1 | 9/2009 | Tanabe | |
| 2009/0322280 | A1* | 12/2009 | Kamijo et al. | 320/108 |
| 2010/0244579 | A1 | 9/2010 | Sogabe et al. | |
| 2011/0270462 | A1 | 11/2011 | Amano et al. | |
| 2012/0175967 | A1* | 7/2012 | Dibben et al. | 307/104 |

FOREIGN PATENT DOCUMENTS

| CN | 101442221 A | 5/2009 |
| CN | 101572423 A | 11/2009 |
| CN | 101667754 A | 3/2010 |
| CN | 101795022 A | 8/2010 |
| JP | 2001-275266 A | 10/2001 |
| JP | 2001309578 A | 11/2001 |
| JP | 2009124889 A | 6/2009 |
| JP | 2009219177 A | 9/2009 |
| JP | 2010119246 A | 5/2010 |
| JP | 2010252498 A | 11/2010 |
| JP | 2010252624 A | 11/2010 |
| KR | 100971705 B1 | 7/2010 |

\* cited by examiner

*Primary Examiner* — Rexford Barnie
*Assistant Examiner* — Toan Vu
(74) *Attorney, Agent, or Firm* — Canon USA, Inc., IP Division

(57) ABSTRACT

A power supply apparatus includes a power supply unit that wirelessly outputs power to an electronic apparatus, a control unit that determines that a predetermined object is detected if a reflection corresponding to power outputted is greater than or equal to a first value and determines that the predetermined object is detected if a change of a reflection corresponding to power outputted by the power supply unit is greater than or equal to a second value.

20 Claims, 7 Drawing Sheets

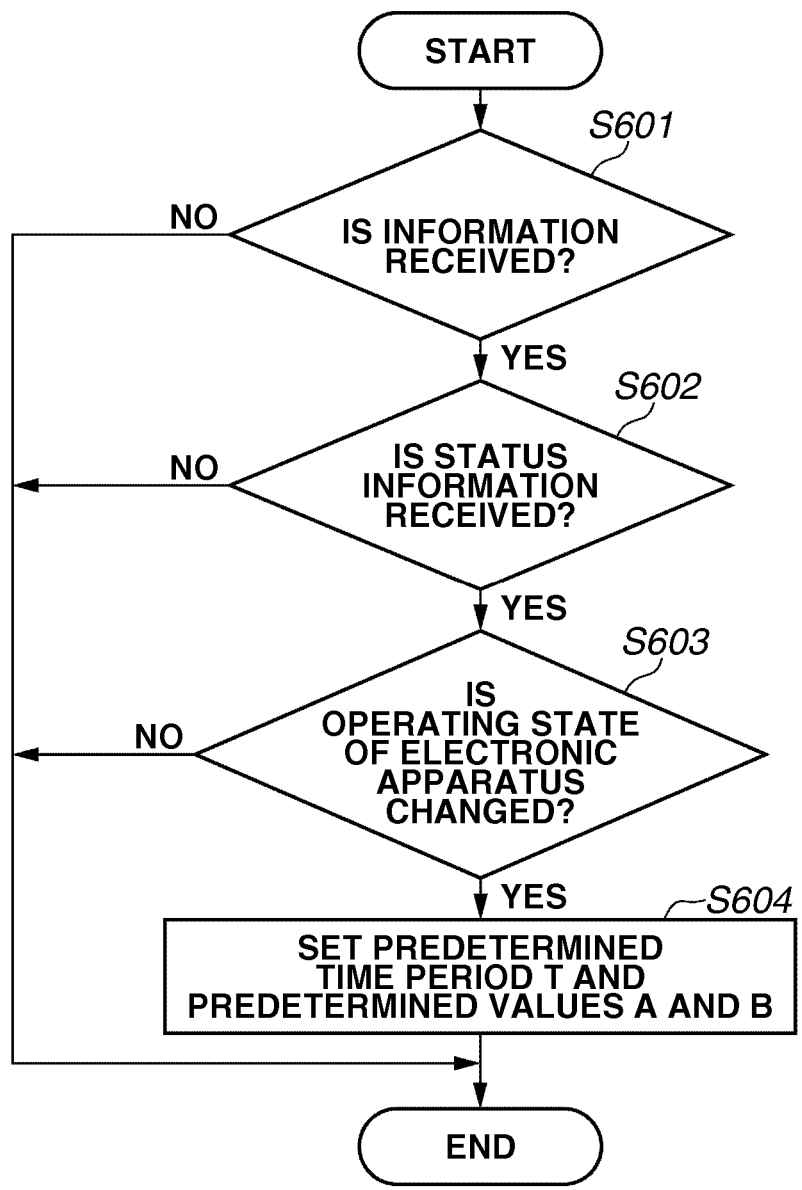

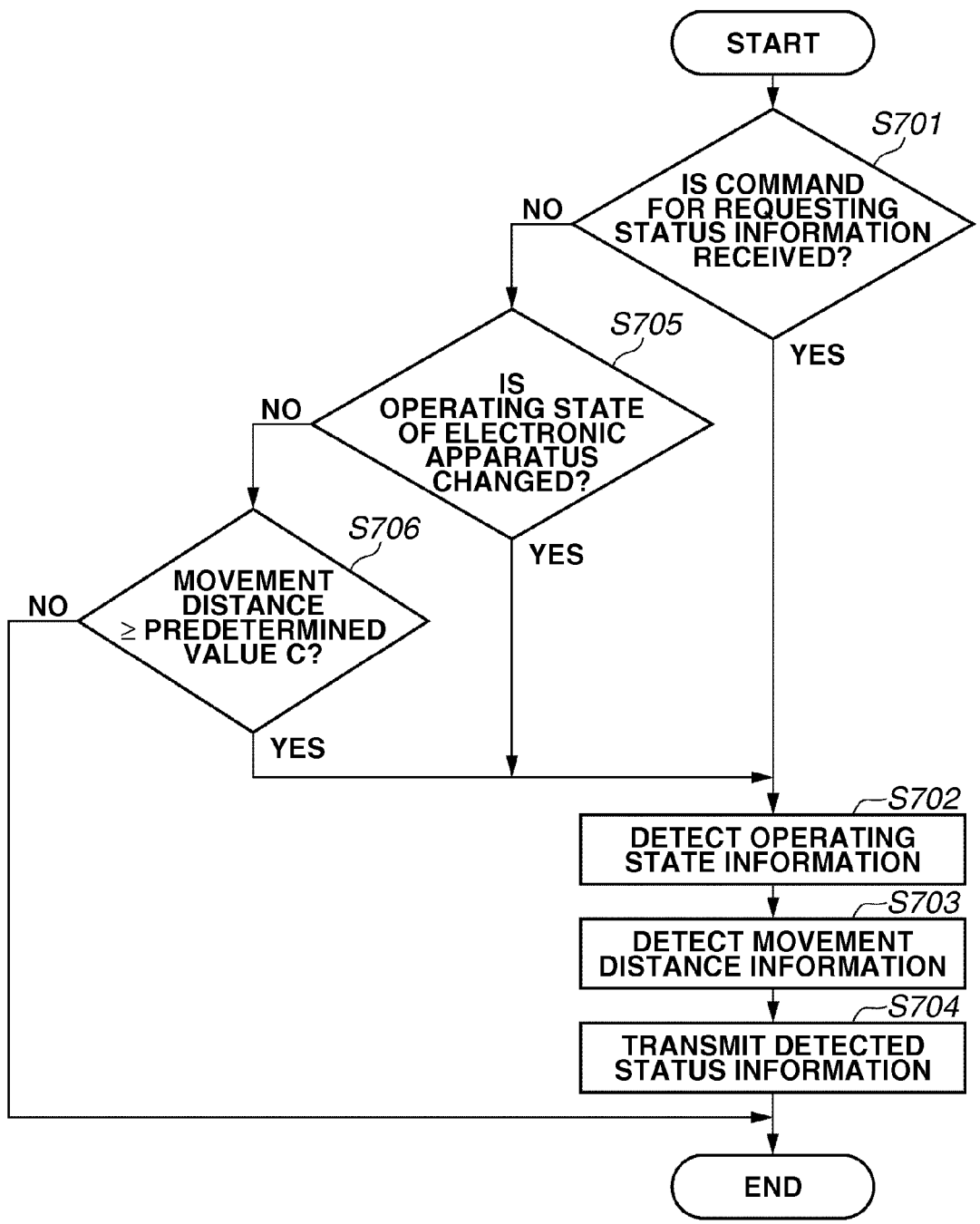

POWER SUPPLY APPARATUS, METHOD, AND STORAGE MEDIUM TO OUTPUT WIRELESS POWER, DETECT VALUE RELATING TO OUTPUT POWER, AND CHARGE BASED ON DETECTED VALUE

BACKGROUND OF THE INVENTION

1. Field of the Invention

The present invention relates to a power supply apparatus for wirelessly supplying power, a method, and a storage medium.

2. Description of the Related Art

In recent years, a power supply system including a power supply apparatus having a primary coil for wirelessly outputting power without connector-based connections, and an electronic apparatus having a secondary coil for wirelessly receiving the power supplied from the power supply apparatus has been known.

Japanese Patent Application Laid-Open No. 2001-275266 discusses such a power supply system in which an electronic apparatus charges a battery by using the power received from a power supply apparatus via a secondary coil.

A conventional power supply apparatus supplies power to an electronic apparatus via a primary coil, and the electronic apparatus receives the power supplied from the power supply apparatus via a secondary coil.

However, there has been a problem that, if a foreign object such as a metal is placed between the primary and secondary coils, the power supply apparatus cannot suitably supply the electric power to the electronic apparatus because of the effect of the foreign object.

To prevent such a problem, it becomes necessary, when the power supply apparatus supplies the power to the electronic apparatus, to detect whether a foreign object exists in the vicinity of the primary coil and to control the power supply depending on the presence or absence of a foreign object.

SUMMARY OF THE INVENTION

One aspect of the present invention is directed to a power supply apparatus capable of detecting a foreign object and suitably supplying power depending on whether a foreign object is exist.

According to an aspect of the present invention, a power supply apparatus includes a power supply unit that wirelessly outputs power to an electronic apparatus, and a control unit that determines that a predetermined object is detected if a reflection corresponding to power outputted by the power supply unit is greater than or equal to a first value, wherein the control unit determines that the predetermined object is detected if a change of a reflection corresponding to power outputted by the power supply unit is greater than or equal to a second value, the predetermined object does not include a chargeable object, and the first value and second value are set based on a status of the electronic apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating exemplary status information acquisition process performed by the power supply apparatus according to the first exemplary embodiment.

FIG. 7 is a flowchart illustrating exemplary status information transmission process performed by an electronic apparatus according to the first exemplary embodiment.

DESCRIPTION OF THE EMBODIMENTS

Various exemplary embodiments, features, and aspects of the invention will be described in detail below with reference to the drawings.

Figure 1:
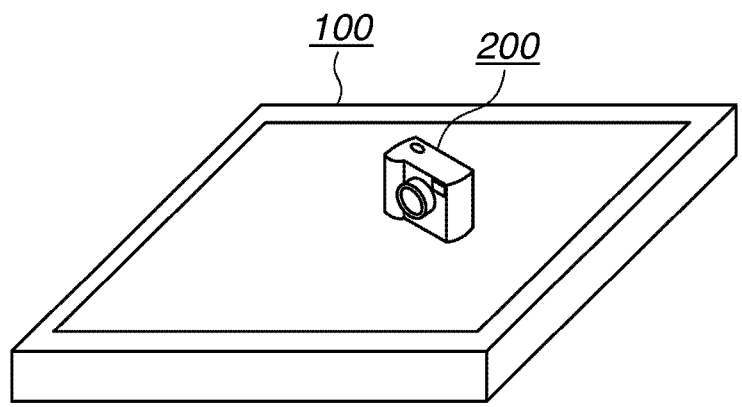
FIG. 1 illustrates an exemplary power supply system according to a first exemplary embodiment.
Figure 2:
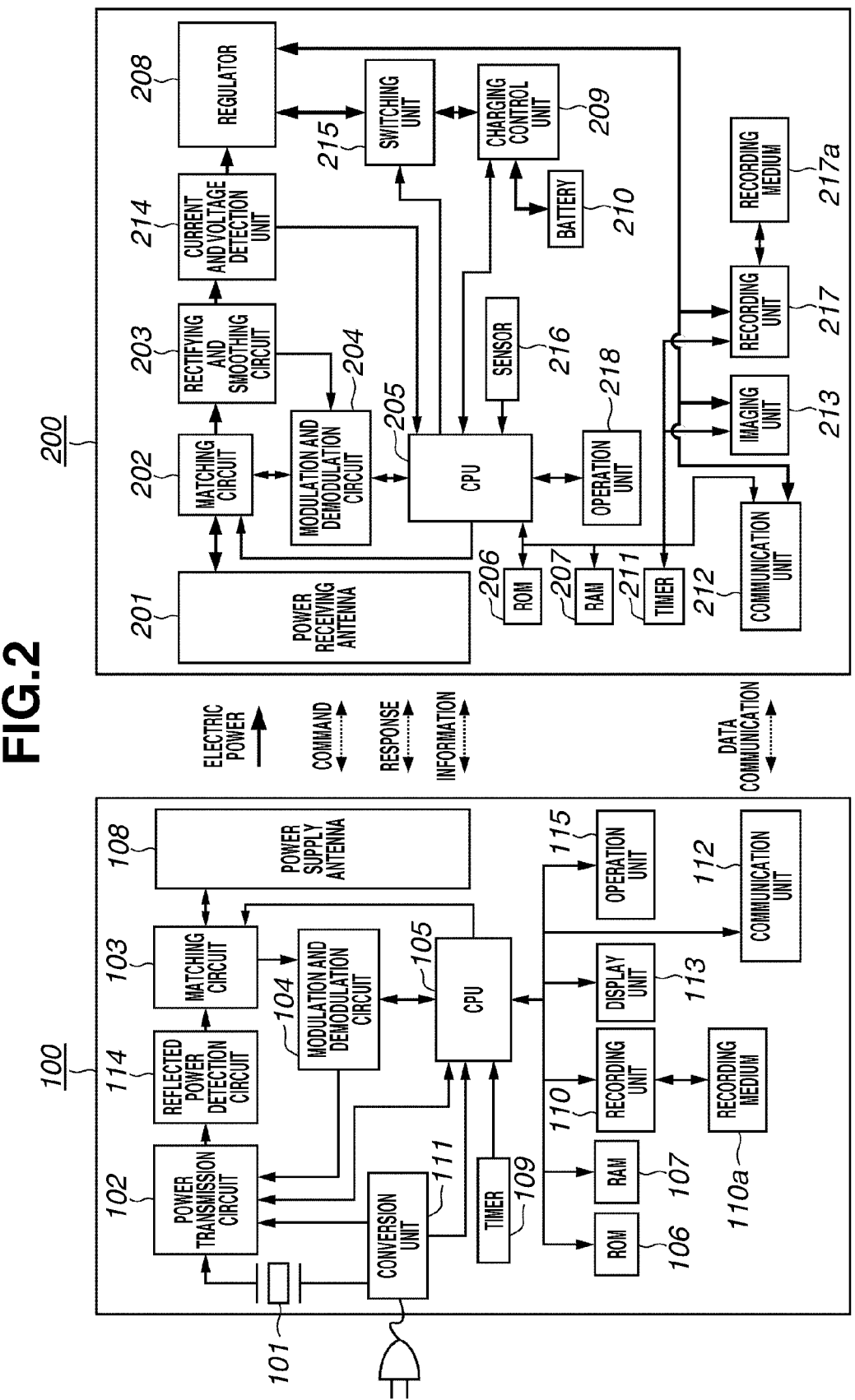
FIG. 2 is a block diagram illustrating an exemplary power supply system according to the first exemplary embodiment.

A power supply system according to a first exemplary embodiment of the present invention includes a power supply apparatus 100 and an electronic apparatus 200, as illustrated in FIG. 1. In the power supply system according to the first exemplary embodiment, for example, when the electronic apparatus 200 is placed onto the power supply apparatus 100 as illustrated in FIG. 1, the power supply apparatus 100 wirelessly supplies power to the electronic apparatus 200 via a power supply antenna 108 (FIG. 2). When the electronic apparatus 200 exists within a predetermined range of distance from the power supply apparatus 100, the electronic apparatus 200 having a power receiving antenna 201 wirelessly receives the power output from the power supply apparatus 100 via the power receiving antenna 201 (FIG. 2). Further, the electronic apparatus 200 charges a battery 210 (FIG. 2) attached to the electronic apparatus 200 by using the power received from the power supply apparatus 100 via the power receiving antenna 201. When the electronic apparatus 200 do not exist within the predetermined range of distance from the power supply apparatus 100, even if the electronic apparatus 200 has the power receiving antenna 201, the electronic apparatus 200 cannot receive the power from the power supply apparatus 100.

The predetermined range is a range over which the electronic apparatus 200 can communicate with the power supply apparatus 100 by using the power supplied from the power supply apparatus 100.

The power supply apparatus 100 is capable of wirelessly and simultaneously supplying power also to a plurality of electronic apparatuses in parallel.

The electronic apparatus 200 may be any imaging apparatus which operates on the power supplied from the battery 210, such as a digital still camera, a cellular phone with a camera, and a digital video camera. The electronic apparatus 200 may also be a reproducing apparatus for reproducing audio and video data, such as a player. Further, the electronic apparatus 200 may be a mobile apparatus driven by the power supplied from the battery 210, such as an automobile. The electronic apparatus 200 may also be an electronic apparatus not having the battery 210, which operates by using the power supplied from the power supply apparatus 100.

FIG. 2 is a block diagram illustrating a power supply system including the power supply apparatus 100 and the electronic apparatus 200.

As illustrated in FIG. 2, the power supply apparatus 100 includes an oscillator 101, a power transmission circuit 102, a matching circuit 103, a modulation and demodulation circuit 104, a central processing unit (CPU) 105, a read-only memory (ROM) 106, a random access memory (RAM) 107, the power supply antenna 108, a timer 109, a recording unit 110, and a conversion unit 111. As illustrated in FIG. 2, the power supply apparatus 100 further includes a communication unit 112, a display unit 113, a reflected power detection circuit 114, and an operation unit 115.

The oscillator 101 oscillates a frequency for controlling the power transmission circuit 102 to convert the power supplied from an alternating current (AC) power source (not illustrated) to the power transmission circuit 102 via the conversion unit 111 into the power corresponding to a target value set by the CPU 105. A crystal oscillator or the like is used as the oscillator 101.

The power transmission circuit 102 generates the power to be supplied to the electronic apparatus 200 via the power supply antenna 108 according to the power supplied from the conversion unit 111 and a frequency of oscillation by the oscillator 101. The power transmission circuit 102 including a field-effect transistor (FET) or the like generates the power to be supplied to the electronic apparatus 200 by controlling a current flowing between the source and drain terminals of the internal FET according to the frequency of oscillation by the oscillator 101. The power transmission circuit 102 supplies the generated power to the matching circuit 103 via the reflected power detection circuit 114. The power transmission circuit 102 generates the first and second power.

The power supply apparatus 100 supplies the first power to the electronic apparatus 200 to supply a command for controlling the electronic apparatus 200. When supplying the power to the electronic apparatus 200, the power supply apparatus 100 supplies the second power thereto. For example, the first power is 1 W or below, and the second power is 2 W to 10 W. The first power is lower than the second power. When the power supply apparatus 100 is supplying the first power to the electronic apparatus 200, the power supply apparatus 100 can transmit a command to the electronic apparatus 200. However, when the power supply apparatus 100 is supplying the second power to the electronic apparatus 200, the power supply apparatus 100 cannot transmit a command to the electronic apparatus 200.

The CPU 105 of the power supply apparatus 100 sets the first power to enable the power supply apparatus 100 to supply a command to any apparatus other than the electronic apparatus 200.

The CPU 105 controls the power transmission circuit 102 to select either one of the first and second power as the power to be supplied to the electronic apparatus 200.

The matching circuit 103 is a resonance circuit for causing resonance, according to the frequency of oscillation by the oscillator 101, between the power supply antenna 108 and a power receiving antenna of an apparatus subjected to power supply selected by the CPU 105.

The matching circuit 103 includes such elements as variable capacitors, variable coils, and resistors. The matching circuit 103 matches impedance between the power transmission circuit 102 and the power supply antenna 108 based on these elements.

The CPU 105 controls capacitance and inductance values of a variable capacitor and a variable coil (not illustrated), respectively, to set the frequency of oscillating by the oscillator 101 to a resonance frequency f. The resonance frequency f is a frequency used for resonating between the power supply apparatus 100 and the apparatus subjected to power supply from the power supply apparatus 100.

The frequency used for resonating between the power supply apparatus 100 and the apparatus subjected to power supply from the power supply apparatus 100 is hereinafter referred to as "resonance frequency f."

The resonance frequency f is represented by formula (1).

$$f = \frac{1}{2\pi\sqrt{LC}} \quad (1)$$

where L indicates the inductance of the matching circuit 103, and C indicates the capacitance of the matching circuit 103.

The matching circuit 103 may include capacitors in addition to variable capacitors, coils in addition to variable coils, and additional resistors.

The CPU 105 sets the frequency of oscillation by the oscillator 101 to the resonance frequency f by controlling capacitance and inductance values of the variable capacitor and the variable coil (not illustrated), respectively. However, the frequency of oscillation by the oscillator 101 may be set to the resonance frequency f by using other methods.

For example, the CPU 105 may set the frequency of oscillation by the oscillator 101 to the resonance frequency f by changing the connection between a capacitor and a coil included in the matching circuit 103.

The resonance frequency f may be the 50/60 Hz commercial frequency, a frequency of ten to several hundreds kHz, or a frequency around 10 MHz.

The matching circuit 103 can also detect a change amount of the current flowing to the power supply antenna 108 and the voltage supplied to the power supply antenna 108.

The power, generated by the power transmission circuit 102 with the frequency of oscillation by the oscillator 101 set to the resonance frequency f, is supplied to the power supply antenna 108 via the reflected power detection circuit 114 and the matching circuit 103.

To transmit a command for controlling the electronic apparatus 200 to the electronic apparatus 200, the modulation and demodulation circuit 104 modulates the power generated by the power transmission circuit 102 according to a predetermined protocol. The predetermined protocol is, for example, a communication protocol compliant with the International Organization for Standardization/International Electrotechnical Commission (ISO/IEC) 18092 standard, such as the Radio Frequency Identification (RFID). The modulation and demodulation circuit 104 converts the power generated by the power transmission circuit 102 into a pulse signal as a command for communication with the electronic apparatus 200. Then, the power supply antenna 108 transmits the pulse signal to the electronic apparatus 200.

The electronic apparatus 200 analyzes the received pulse signal to detect bit data containing information "1" and "0." A command includes identification information for identifying a destination address and a command code indicating an operation instructed by the command. The CPU 105 can also transmit a command only to the electronic apparatus 200 by controlling the modulation and demodulation circuit 104 to change the identification information included in the command. The CPU 105 can also transmit a command to the electronic apparatus 200 and other apparatuses by controlling the modulation and demodulation circuit 104 to change the identification information included in the command.

The modulation and demodulation circuit 104 converts the power generated by the power transmission circuit 102 into a pulse signal through the amplitude shift keying (ASK) modulation method based on amplitude variation. The ASK modulation method based on amplitude variation is used, for example, for wireless communication between an IC card and a card reader.

The modulation and demodulation circuit 104 changes the amplitude of the power generated by the power transmission circuit 102 by switching analog multipliers and load resistors included in the modulation and demodulation circuit 104. Thus, the modulation and demodulation circuit 104 converts the power generated by the power transmission circuit 102 into a pulse signal. The modulation and demodulation circuit 104 supplies the pulse signal converted thereby to the power supply antenna 108 which transmits the pulse signal to the electronic apparatus 200 as a command.

The modulation and demodulation circuit 104 further includes an encoding circuit based on a predetermined encoding method.

According to variation in the current flowing to the power supply antenna 108 detected by the matching circuit 103, the modulation and demodulation circuit 104 can demodulate a response from the electronic apparatus 200 corresponding to a command transmitted to the electronic apparatus 200 by using the encoding circuit. Thus, the modulation and demodulation circuit 104 can receive from the electronic apparatus 200 a response to a command transmitted to the electronic apparatus 200 by using a load modulation method. The modulation and demodulation circuit 104 transmits a command to the electronic apparatus 200 in response to an instruction from the CPU 105. Upon reception of a response from the electronic apparatus 200, the modulation and demodulation circuit 104 demodulates the received response and supplies the response to the CPU 105.

When an AC power source (not illustrated) is connected with the power supply apparatus 100, the CPU 105 controls the power supply apparatus 100 by using the power supplied from the AC power source (not illustrated) via the conversion unit 111. The CPU 105 further controls operations of the power supply apparatus 100 by executing a computer program stored in the ROM 106. The CPU 105 controls the power to be supplied to the electronic apparatus 200 by controlling the power transmission circuit 102. The CPU 105 further transmits a command to the electronic apparatus 200 by controlling the modulation and demodulation circuit 104.

The ROM 106 stores the computer program for controlling operations of the power supply apparatus 100 and information such as parameters regarding operations of the power supply apparatus 100. The ROM 106 records video data to be displayed on the display unit 113. The ROM 106 further records a table for managing identification information of the electronic apparatus 200 subjected to power supply from the power supply apparatus 100.

The RAM 107, a rewritable nonvolatile memory, temporarily records a computer program for controlling operations of the power supply apparatus 100, information such as parameters regarding operations of the power supply apparatus 100, and information received from the electronic apparatus 200 by the modulation and demodulation circuit 104.

The power supply antenna 108 outputs the power generated by the power transmission circuit 102 to the outside the power supply apparatus 100.

The power supply apparatus 100 supplies the power to the electronic apparatus 200 via the power supply antenna 108, and transmits a command to the electronic apparatus 200 via the power supply antenna 108. The power supply apparatus 100 further receives via the power supply antenna 108 a command from the electronic apparatus 200, a response to a command transmitted to the electronic apparatus 200, and information transmitted from the electronic apparatus 200.

The timer 109 measures the present time, and the time regarding operations and process executed by each unit. A threshold value for the time period measured by the timer 109 is prerecorded on the ROM 106.

The recording unit 110 records on recording medium 110a video data, audio data, and other data received by the communication unit 112.

The recording unit 110 further reads video data, audio data, and other data from the recording medium 110a, and supplies these pieces of data to the RAM 107, the communication unit 112, and the display unit 113.

The recording medium 110a may be a hard disk, a memory card, or other recording media which may be built in the power supply apparatus 100 or detachably attached to the power supply apparatus 100.

When the AC power source (not illustrated) is connected with the power supply apparatus 100, the conversion unit 111 converts the AC power supplied from the AC power source (not illustrated) into the direct current (DC) power, and supplies the DC power to the entire power supply apparatus 100.

The communication unit 112 transmits the moving image and audio data supplied from the RAM 107 and any one of the recording medium 110a to the electronic apparatus 200. The communication unit 112 further receives the moving image and audio data transmitted from the electronic apparatus 200 to the power supply apparatus 100.

For example, the communication unit 112 may perform communication through such a serial bus interface as the Universal Serial Bus (USB). For example, the communication unit 112 may perform communication through such an interface as the High-Definition Multimedia Interface (HDMI) (registered trademark). The communication unit 112 may further perform communication compliant with the wireless communication system. For example, the communication unit 112 may further perform wireless communication according to the 802.11a, b, g, and n standards prescribed in the wireless LAN standard. The communication unit 112 may transmit and receive moving image and audio data by modulating the data into a signal compliant with the wireless LAN standard.

Even when the modulation and demodulation circuit 104 is transmitting a command to the electronic apparatus 200 via the power supply antenna 108, the communication unit 112 can transmit and receive moving image and audio data to/from the electronic apparatus 200. Even when the modulation and demodulation circuit 104 is receiving from the electronic apparatus 200 a response to a command via the power supply antenna 108, the communication unit 112 can transmit and receive moving image and audio data to/from the electronic apparatus 200.

The display unit 113 displays any one of video data read from the recording medium 110a by the recording unit 110, video data supplied from the RAM 107, video data supplied from the ROM 106, and video data supplied from the communication unit 112. The display unit 113 can also display video data read from the recording medium 110a, and icons and menu screens prerecorded on the ROM 106.

The reflected power detection circuit 114 detects the information about an amplitude voltage V1 of a traveling wave of the power output by the power supply antenna 108, and the information about an amplitude voltage V2 of a reflected wave of the power output by the power supply antenna 108.

The information about the amplitude voltage V1 and the information about the amplitude voltage V2 detected by the reflected power detection circuit 114 are supplied to the CPU 105.

The CPU 105 records on the RAM 107 the information about the amplitude voltage V1 and the information about the amplitude voltage V2 supplied from the reflected power detection circuit 114.

Figure 3:
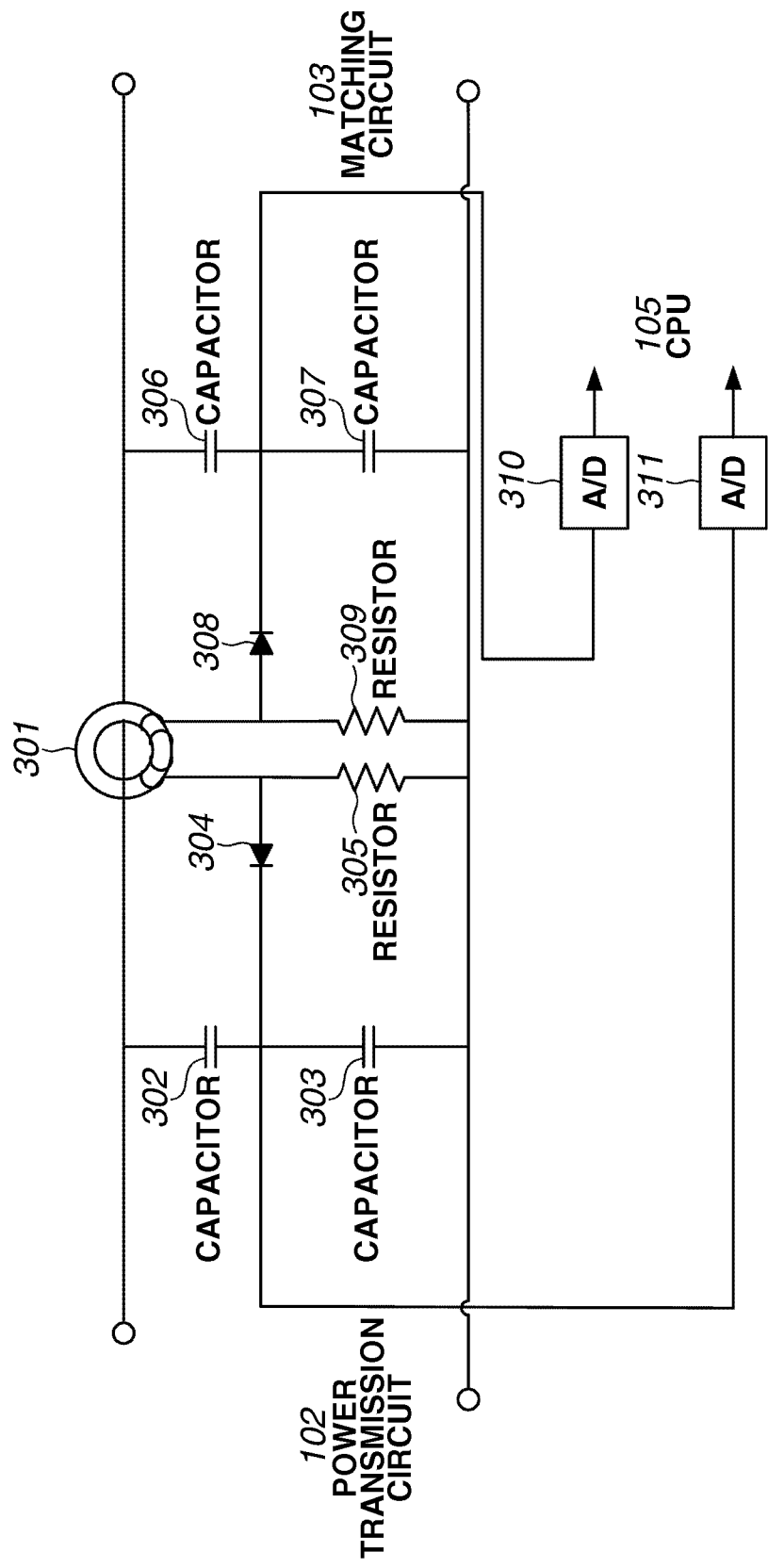
FIG. 3 illustrates an exemplary configuration of a reflected power detection circuit of a power supply apparatus according to the first and secondary exemplary embodiments.

FIG. 3 illustrates an exemplary configuration of the reflected power detection circuit 114.

As illustrated in FIG. 3, the reflected power detection circuit 114 includes a toroidal core 301; capacitors 302, 303, 306, and 307; diodes 304 and 308; and resistors 305 and 309. The reflected power detection circuit 114 further includes A/D converters 310 and 311.

The reflected power detection circuit 114 detects the traveling wave of the power output by the power supply antenna 108 as a voltage of the capacitor 307 by using the CM (capacitive and mutual inductive) coupling. The reflected power detection circuit 114 converts the detected analog voltage value of the capacitor 307 to digital form by using the A/D converter 310, and supplies the digital voltage value to the CPU 105.

The reflected power detection circuit 114 detects the reflected wave of the power output by the power supply antenna 108 as a voltage of the capacitor 303 by using the CM coupling. The reflected power detection circuit 114 further converts the detected analog voltage value of the capacitor 303 to digital form by using the A/D converter 311, and supplies the digital voltage value to the CPU 105.

In the reflected power detection circuit 114, inductive coupling is generated by the toroidal core 301 and capacitive coupling is generated by the capacitors 302 and 306.

The CPU 105 detects the voltage supplied from the A/D converter 310 as the amplitude voltage V1 of the traveling wave and detects the voltage supplied from the A/D converter 311 as the amplitude voltage V2 of the reflected wave. The CPU 105 acquires a voltage reflection coefficient ρ based on the amplitude voltage V1 of the traveling wave and the amplitude voltage V2 of the reflected wave. The CPU 105 further calculates the voltage standing wave ratio (VSWR) based on the voltage reflection coefficient ρ.

The VSWR indicates a relation between the traveling and reflected waves of the power output from the power supply antenna 108. The closer the value of the VSWR is to 1, the smaller the reflected power. This state provides a small loss of the power supplied from the power supply apparatus 100 to an external electronic apparatus, indicating a favorable efficiency.

The voltage reflection coefficient ρ is represented by formula (2).

$$\rho = \frac{V2}{V1} \quad (2)$$

The VSWR is represented by formula (3).

$$VSWR = \frac{1+\rho}{1-\rho} \quad (3)$$

The voltage standing wave ratio is hereinafter referred to simply as VSWR.

The CPU 105 determines whether a foreign object exists in the vicinity of the power supply apparatus 100 based on the calculated VSWR.

The operation unit 115 provides a user with a user interface for operating the power supply apparatus 100. The operation unit 115 includes a power button for operating the power supply apparatus 100 and a mode switching button for selecting an operation mode of the power supply apparatus 100. Each button is composed of a switch and a touch panel. The CPU 105 controls the power supply apparatus 100 in response to a user instruction input via the operation unit 115. The operation unit 115 may control the power supply apparatus 100 in response to a remote control signal received from a remote controller (not illustrated).

The power supply apparatus 100 may further includes a loudspeaker unit (not illustrated). The loudspeaker unit (not illustrated) outputs any one of audio data read from the recording medium 110a by the recording unit 110, audio data supplied from the ROM 106, audio data supplied from the RAM 107, and audio data supplied from the communication unit 112.

The power supply apparatus 100 has first and second power supply modes as operation modes. In the first power supply mode, the power supply apparatus 100 supplies either one of the first and second power to the electronic apparatus 200. In the second power supply mode, the power supply apparatus 100 transmits and receives moving image and audio data to/from the electronic apparatus 200 via the communication unit 112 while supplying either one of the first and second power to the electronic apparatus 200.

When the power supply apparatus 100 supplies the power to the electronic apparatus 200, a unit including at least the power transmission circuit 102, the matching circuit 103, the modulation and demodulation circuit 104, and the power supply antenna 108 supplies either one of the first and second power to the electronic apparatus 200.

When the power supply apparatus 100 transmits a command to the electronic apparatus 200, a unit including at least the power transmission circuit 102, the matching circuit 103, the modulation and demodulation circuit 104, and the power supply antenna 108 outputs the first power and a command to the electronic apparatus 200.

When the power supply apparatus 100 transmits at least either one of moving image and audio data to the electronic apparatus 200, the communication unit 112 transmits at least either one of moving image and audio data to the electronic apparatus 200.

When the power supply apparatus 100 receives at least either one of moving image and audio data from the electronic apparatus 200, the communication unit 112 receives at least either one of moving image and audio data from the electronic apparatus 200.

An exemplary configuration of the electronic apparatus 200 will be described below with reference to FIG. 2.

As an exemplary electronic apparatus 200, a digital still camera will be described below.

The electronic apparatus 200 includes a power receiving antenna 201, a matching circuit 202, a rectifying and smoothing circuit 203, a modulation and demodulation circuit 204, a CPU 205, a ROM 206, a RAM 207, a regulator 208, a charging control unit 209, a battery 210, and a timer 211. The electronic apparatus 200 further includes a communication unit 212, an imaging unit 213, a current and voltage detection unit 214, a switching unit 215, a sensor 216, a recording unit 217, and an operation unit 218.

The power receiving antenna 201 receives the power supplied from the power supply apparatus 100. The electronic apparatus 200 receives the power and a command from the power supply apparatus 100 via the power receiving antenna 201. The electronic apparatus 200 further transmits via the power receiving antenna 201a command for controlling the power supply apparatus 100, a response to a command received from the power supply apparatus 100, and predetermined information.

The matching circuit 202 is a resonance circuit for matching the impedance to cause that the power receiving antenna 201 to resonate by using the same frequency as the resonance frequency f of the power supply apparatus 100. Similar to the matching circuit 103, the matching circuit 202 includes capacitors, coils, variable capacitors, variable coils, and resistors. The matching circuit 202 controls capacitance values of variable capacitors, inductance values of variable coils, and impedance values of variable resistors so that the power receiving antenna 201 resonates at the same frequency as the resonance frequency f of the power supply apparatus 100.

The matching circuit 202 further supplies the power received by the power receiving antenna 201 to the rectifying and smoothing circuit 203.

The rectifying and smoothing circuit 203 removes a command and noise from the power received by the power receiving antenna 201 to generate the DC power. The rectifying and smoothing circuit 203 further supplies the generated DC power to the regulator 208 via the current and voltage detection unit 214. The rectifying and smoothing circuit 203 supplies the command removed from the power received by the power receiving antenna 201 to the modulation and demodulation circuit 204. The rectifying and smoothing circuit 203 includes a rectifying diode and generates the DC power through either one of full-wave rectification and half-wave rectification. The rectifying and smoothing circuit 203 supplies the generated DC power to the regulator 208 via the current and voltage detection unit 214.

The modulation and demodulation circuit 204 analyzes the command supplied from the rectifying and smoothing circuit 203 based on the power supply apparatus 100 and a predetermined communication protocol, and supplies a result of the command analysis to the CPU 205.

When the electronic apparatus 200 is supplied with the power from the power supply apparatus 100, the CPU 205 controls the modulation and demodulation circuit 204 to fluctuate a load included therein to enable transmitting a command, a response to a command, and predetermined information to the power supply apparatus 100. When the load included in the modulation and demodulation circuit 204 fluctuates, the current flowing to the power supply antenna 108 changes accordingly. Thus, by detecting variation in the current flowing to the power supply antenna 108, the power supply apparatus 100 receives a command, a response to a command, and predetermined information transmitted by the electronic apparatus 200.

Based on the analysis result supplied from the modulation and demodulation circuit 204, the CPU 205 determines a command received by the modulation and demodulation circuit 204, and controls the electronic apparatus 200 to perform process and operations specified by a command code corresponding to the received command.

The CPU 205 further controls operations of the electronic apparatus 200 by executing a computer program stored in the ROM 206.

The ROM 206 stores the computer program for controlling operations of the electronic apparatus 200 and information such as parameters regarding operations of the electronic apparatus 200. The ROM 206 further stores identification information of the electronic apparatus 200, device information of the electronic apparatus 200, and display data. The identification information of the electronic apparatus 200 indicates an identifier (ID) of the electronic apparatus 200. The device information of the electronic apparatus 200 includes the name of a manufacture of the electronic apparatus 200, the device name of the electronic apparatus 200, the manufacture date of the electronic apparatus 200, and power receiving information of the electronic apparatus 200.

The power receiving information of the electronic apparatus 200 includes the information about a maximum power receivable by the electronic apparatus 200, the information about a minimum power receivable by the electronic apparatus 200, and the information about the power necessary for the electronic apparatus 200 to perform command-based communication with the power supply apparatus 100. The power receiving information of the electronic apparatus 200 further includes the information about the power necessary for the electronic apparatus 200 to operate the communication unit 212, the information about the power necessary for the electronic apparatus 200 to charge the battery 210, and the information about the power necessary for the electronic apparatus 200 to operate the imaging unit 213. The power receiving information of the electronic apparatus 200 further includes the information about the power necessary for the electronic apparatus 200 to operate the recording unit 217.

The ROM 206 further records a first table, a second table, and a third table.

The first table includes a table associated with an operating state indicating operations of the electronic apparatus 200, a movement distance indicating the distance over which the electronic apparatus 200 moved, and a predetermined value A. The operating state of the electronic apparatus 200 changes according to its operation mode, and the process and operations performed by the electronic apparatus 200. The operating state of the electronic apparatus 200 further corresponds to the power consumed by the electronic apparatus 200.

The value of the movement distance of the electronic apparatus 200 indicates a distance calculated by the CPU 205 based on positional information detected by the sensor 216. The movement distance of the electronic apparatus 200 changes when the position of the electronic apparatus 200 is moved by the user or the influence of vibration.

The predetermined value A is used for foreign object detection process performed by the power supply apparatus 100. The predetermined value A indicates a change amount of the VSWR corresponding to at least either one of the operating state of the electronic apparatus 200 and the movement distance of the electronic apparatus 200.

The predetermined value A is recorded in association with the operating state of the electronic apparatus 200 and the movement distance of the electronic apparatus 200.

The CPU 205 detects the information about the operating state of the electronic apparatus 200 and the information about the movement distance of the electronic apparatus 200 to enable detecting the predetermined value A by using the information about the operating state of the electronic apparatus 200, the information about the movement distance of the electronic apparatus 200, and the first table.

The second table includes a table associated with the operating state of the electronic apparatus 200, the movement distance of the electronic apparatus 200, and a predetermined value B.

The predetermined value B is used for the foreign object detection process performed by the power supply apparatus 100. The predetermined value B indicates the VSWR corresponding to at least either one of the operating state of the electronic apparatus 200 and the movement distance of the electronic apparatus 200.

The predetermined value B is recorded in association with the operating state of the electronic apparatus 200 and the movement distance of the electronic apparatus 200.

The CPU 205 detects the information about the operating state of the electronic apparatus 200 and the information about the movement distance of the electronic apparatus 200 to enable detecting the predetermined value B by using the information about the operating state of the electronic apparatus 200, the information about the movement distance of the electronic apparatus 200, and the second table.

The third table includes a table associated with the operating state of the electronic apparatus 200, the movement distance of the electronic apparatus 200, and a predetermined time period T.

The predetermined time period T is a time period used as a threshold value for controlling the power supply apparatus 100 not to transmit a command for requesting the electronic apparatus 200 for the predetermined values A and B. The predetermined time period T indicates a time period corresponding to at least either one of the operating state of the electronic apparatus 200 and the movement distance of the electronic apparatus 200. The predetermined time period T is recorded in association with the operating state of the electronic apparatus 200 and the movement distance of the electronic apparatus 200.

Based on at least either one of the operating state of the electronic apparatus 200 and the movement distance of the electronic apparatus 200, the CPU 205 needs to set a time period for controlling the power supply apparatus 100 not to transmit a command for requesting the electronic apparatus 200 for the predetermined values A and B.

An object of this process is to enable the power supply apparatus 100 to correctly detect a foreign object. When at least either one of the operating state of the electronic apparatus 200 and the movement distance of the electronic apparatus 200 corresponds to a state where the VSWR rapidly changes, the power supply apparatus 100 may not correctly perform the foreign object detection process. Accordingly, when at least either one of the operating state of the electronic apparatus 200 and the movement distance of the electronic apparatus 200 corresponds to a state where the VSWR rapidly changes, the CPU 205 sets a short predetermined time period T.

When at least either one of the operating state of the electronic apparatus 200 and the movement distance of the electronic apparatus 200 does not correspond to a state where the VSWR rapidly changes, the CPU 205 sets the predetermined time period T which is longer than that in a state of the electronic apparatus 200 where the VSWR rapidly changes.

The CPU 205 detects the information about the operating state of the electronic apparatus 200 and the information about the movement distance of the electronic apparatus 200 to enable detecting the predetermined time period T by using the information about the operating state of the electronic apparatus 200, the information about the movement distance of the electronic apparatus 200, and the third table.

The CPU 205 further periodically detects the information about the operating state of the electronic apparatus 200 and the information about the movement distance of the electronic apparatus 200 to enable detecting the predetermined values A and B and the predetermined time period T. The CPU 205 further records on the RAM 207 the information about the operating state of the detected electronic apparatus 200, the information about the movement distance of the electronic apparatus 200, and information including the predetermined values A and B and the predetermined time period T. The information including the predetermined values A and B and the predetermined time period T is hereinafter referred to as "status information." The status information includes at least the predetermined values A and B and the predetermined time period T detected by the CPU 205. The status information may include the information about the operating state of the electronic apparatus 200 and the information about the movement distance of the electronic apparatus 200.

The RAM 207, a rewritable nonvolatile memory, temporarily records a computer program for controlling operations of each unit of the electronic apparatus 200, information such as parameters regarding operations of the electronic apparatus 200, and information transmitted from the power supply apparatus 100.

The regulator 208 controls either one of the voltage of the DC power supplied from the rectifying and smoothing circuit 203 and the voltage of the power supplied from the battery 210 to become a voltage value set by the CPU 205. The regulator 208 may be a switching regulator or a linear regulator.

When the regulator 208 is not supplied with the power from the battery 210 but supplied with either one of the first and second power from the power supply apparatus 100, the regulator 208 supplies to the entire electronic apparatus 200 the DC power supplied from the rectifying and smoothing circuit 203. In this case, the regulator 208 supplies to the charging control unit 209 and the battery 210 via the switching unit 215 the DC power supplied from the rectifying and smoothing circuit 203.

When the regulator 208 is not supplied with either one of the first and second power from the power supply apparatus 100 but supplied with the power from the battery 210 via the switching unit 215, the regulator 208 supplies to the entire electronic apparatus 200 the power supplied from the battery 210.

When the regulator 208 is supplied with the power from the power supply apparatus 100 and the battery 210, the regulator 208 supplies to the entire electronic apparatus 200 the DC power supplied from the rectifying and smoothing circuit 203. In this case, the regulator 208 may not supply to the communication unit 212, the imaging unit 213, and the recording unit 217 the power supplied from the battery 210 to prevent reduction in the remaining capacity of the battery 210.

When the regulator 208 is supplied with the power from at least either one of the battery 210 and the power supply apparatus 100, the regulator 208 enables the supplied DC power to be supplied to the CPU 205, the sensor 216, the ROM 206, the RAM 207, and the timer 211. When the regulator 208 is supplied with the power from at least either one of the battery 210 and the power supply apparatus 100, the regulator 208 further enables the supplied power to be supplied to the modulation and demodulation circuit 204, the matching circuit 202, the rectifying and smoothing circuit 203, and the current and voltage detection unit 214.

When the charging control unit 209 is supplied with the power from the regulator 208 via the switching unit 215, the charging control unit 209 charges the battery 210 according to the supplied power. The charging control unit 209 charges the battery 210 by using the constant-voltage constant-current control method. The charging control unit 209 further periodically detects the information about the remaining capacity of the attached battery 210, and supplies the information to the CPU 205.

The information about the remaining capacity of the battery 210 is hereinafter referred to as "remaining capacity information."

The CPU 205 records on the RAM 207 charging information including the remaining capacity information.

In addition to the remaining capacity information, the charging information may include the information about whether the battery 210 is fully charged, and the information about a time period elapsed since the charging control unit 209 started charging the battery 210. The charging information may further include the information about that the charging control unit 209 is charging the battery 210 through constant-voltage control, and the information about that the charging control unit 209 is charging the battery 210 through constant-current control. The charging information may further include the information about that the charging control unit 209 is performing trickle charge for the battery 210, and the information about that the charging control unit 209 is performing boost charge for the battery 210.

When charging the battery 210, the charging control unit 209 detects a current flowing to the battery 210 and a voltage supplied to the battery 210, and supplies the relevant information to the CPU 205. The CPU 205 records on the RAM 207 the information about the current flowing to the battery 210 supplied from the charging control unit 209 and the information about the voltage supplied to the battery 210 by the charging control unit 209. The CPU 205 can detect an error for the charge of the battery 210 based on the information about the current flowing to the battery 210 and the information about the voltage supplied to the battery 210 detected by the charging control unit 209. When the CPU 205 detects the error, it controls the modulation and demodulation circuit 204 to transmit error information about that an error occurred in the electronic apparatus 200 to the power supply apparatus 100 via the power receiving antenna 201.

The battery 210 is detachably attached to the electronic apparatus 200. The battery 210 is a rechargeable secondary battery, for example, a lithium ion battery. The battery 210 can supply the power to the electronic apparatus 200.

The timer 211 measures the present time, and a time period regarding operations and process executed by each unit. A threshold value for the time period measured by the timer 211 is prerecorded on the ROM 206.

The communication unit 212 can transmit and receive moving image and audio data recorded on the ROM 206 and a recording medium 217a to/from the power supply apparatus 100.

The communication unit 212 transmits and receives moving image and audio data according to the communication protocol commonly used by the communication unit 112. For example, the communication unit 212 may further transmit and receive moving image and audio data according to the 802.11a, b, g, and n standards prescribed in the wireless LAN standard.

The imaging unit 213 includes an image sensor for generating video data from a subject's optical image, an image processing circuit for applying image process to the moving image generated by the image sensor, and a compression/decompression circuit for compressing video data and decompressing compressed video data. The imaging unit 213 captures a subject's image and supplies to the recording unit 217 still image and video data acquired by image capturing. The recording unit 217 records on the recording medium 217a the still image and video data supplied from the imaging unit 213. The imaging unit 213 may further include other configurations necessary to capture a subject's image.

The current and voltage detection unit 214 detects current information about the current value of the power supplied from the rectifying and smoothing circuit 203, and voltage information about the voltage value of the power supplied from the rectifying and smoothing circuit 203.

The current and voltage detection unit 214 supplies the detected current information and voltage information to the CPU 205.

The CPU 205 records on the RAM 207 the current information and voltage information supplied from the current and voltage detection unit 214. Based on the current information and voltage information supplied from current and voltage detection unit 214, the CPU 205 can also calculate the power consumed by the electronic apparatus 200.

The switching unit 215 is a switch for connecting the regulator 208 to the charging control unit 209. The CPU 205 connects the regulator 208 to the charging control unit 209 by turning ON the switching unit 215, and disconnects the regulator 208 from the charging control unit 209 by turning OFF the switching unit 215.

When the electronic apparatus 200 is operating in the charging mode and the switching unit 215 is ON, the regulator 208 supplies to the charging control unit 209 and the battery 210 via the switching unit 215 the power supplied from the rectifying and smoothing circuit 203. When the electronic apparatus 200 is operating in the charging mode and the switching unit 215 is OFF, the regulator 208 cannot supply to the charging control unit 209 and the battery 210 via the switching unit 215 the power supplied from the rectifying and smoothing circuit 203.

When the electronic apparatus 200 is operating in a non-charging mode and the switching unit 215 is ON, the regulator 208 is supplied with the power from the battery 210 via the switching unit 215.

When the electronic apparatus 200 is operating in a non-charging mode and the switching unit 215 is OFF, the regulator 208 is not supplied with the power from the battery 210 via the switching unit 215.

When the electronic apparatus 200 is operating in the charging mode and the battery 210 is fully charged, the CPU 205 turns OFF the switching unit 215.

When the electronic apparatus 200 is operating in a non-charging mode and the CPU 205 detects the connection between an AC power source (not illustrated) and the electronic apparatus 200, the CPU 205 turns OFF the switching unit 215. In this case, the regulator 208 is supplied with the power from the AC power source (not illustrated), and the regulator 208 supplies to the entire electronic apparatus 200 the power supplied from the AC power source (not illustrated).

The switching unit 215 may be a relay switch or a switch prepared on the electronic apparatus 200.

The sensor 216 detects the position of the electronic apparatus 200. The sensor 216 supplies positional information about the detected position of the electronic apparatus 200 to the CPU 205. The positional information of the electronic apparatus 200 is, for example, the information about the position of the power receiving antenna 201 of the electronic apparatus 200 with respect to a plane on which the power supply antenna 108 of the power supply apparatus 100 is installed. The positional information of the electronic apparatus 200 may also be, for example, the information about the position of the electronic apparatus 200 placed onto the plane on which the power supply antenna 108 of the power supply apparatus 100 is installed. The positional information of the electronic apparatus 200 may also be, for example, the information about the position of the electronic apparatus 200 existing in the air above the plane on which the power supply antenna 108 of the power supply apparatus 100 is installed.

The CPU 205 periodically acquires positional information detected by the sensor 216 to detect the information about the movement distance of the electronic apparatus 200 based on the acquired positional information. The information about the movement distance of the electronic apparatus 200 detected by the CPU 205 is recorded on the RAM 207.

The sensor 216 may be a sensor for detecting the distance over which the electronic apparatus 200 is moved by the user. In this case, the sensor 216 detects the movement distance of the electronic apparatus 200, and supplies the information about the movement distance of the electronic apparatus 200 to the CPU 205. In this case, the information about the movement distance of the electronic apparatus 200 supplied to the CPU 205 is recorded on the RAM 207.

The recording unit 217 records on the recording medium 217a video data, audio data, and other data supplied from either one of the communication unit 212 and the imaging unit 213.

The recording unit 217 can also read video data, audio data, and other data from the recording medium 217a, and supply these pieces of data to the RAM 207 and the communication unit 212.

The recording medium 217a may be a hard disk, a memory card, or other recording media which may be built in the electronic apparatus 200 or detachably attached to the electronic apparatus 200.

The operation unit 218 provides a user with a user interface for operating the electronic apparatus 200. The operation unit 218 includes a power button for operating the electronic apparatus 200 and a mode switching button for selecting an operation mode of the electronic apparatus 200. Each button is composed of a switch and a touch panel. The CPU 205 controls the electronic apparatus 200 in response to a user instruction input via the operation unit 218. The operation unit 218 may control the electronic apparatus 200 in response to a remote control signal received from a remote controller (not illustrated).

The power supply antenna 108 and the power receiving antenna 201 may be a helical antenna, a loop antenna, or a planar antenna such as a meander line antenna.

In the first exemplary embodiment, the process performed by the power supply apparatus 100 is also applicable to a system in which the power supply apparatus 100 wirelessly supplies the power to the electronic apparatus 200 via electromagnetic field coupling. Similarly, in the first exemplary embodiment, the process performed by the electronic apparatus 200 is also applicable to a system in which the power supply apparatus 100 wirelessly supplies the power to the electronic apparatus 200 via electromagnetic field coupling.

Providing an electrode as the power supply antenna 108 on the power supply apparatus 100 and providing an electrode as the power receiving antenna 201 on the electronic apparatus 200 enable applying the present invention to a system in which the power supply apparatus 100 supplies the power to the electronic apparatus 200 via electric field coupling.

The process performed by the power supply apparatus 100 and the process performed by the electronic apparatus 200 are also applicable to a system in which the power supply apparatus 100 wirelessly supplies the power to the electronic apparatus 200 via electromagnetic induction.

In the first exemplary embodiment, the power supply apparatus 100 wirelessly transmits the power to the electronic apparatus 200, and the electronic apparatus 200 wirelessly receives the power from the power supply apparatus 100. However, the word "wireless" may be replaced with "non-contact" or "no contact."

The foreign object detection process performed by the power supply apparatus 100 according to the first exemplary embodiment will be described below with reference to the flowchart in FIG. 4. The power supply apparatus 100 performs the foreign object detection process (FIG. 4) to the electronic apparatus 200 existing within the predetermined range of distance therefrom. The CPU 105 executes the foreign object detection process (FIG. 4) when the power supply apparatus 100 has an operation mode of either one of the first and second power supply modes.

A case where the power supply apparatus 100 performs the foreign object detection process (FIG. 4) to the electronic apparatus 200 will be described below. In this case, the power supply apparatus 100 has recorded on the RAM 107 the identification information of the electronic apparatus 200 and the device information of the electronic apparatus 200 already acquired from the electronic apparatus 200, and that the electronic apparatus 200 exists within the predetermined range of distance from the power supply apparatus 100. The CPU 105 controls the process illustrated in the flowchart in FIG. 4 by executing the computer program stored in the ROM 106.

In step S401, the CPU 105 controls the oscillator 101, the power transmission circuit 102, and the matching circuit 103 to supply the first power to the electronic apparatus 200. Then, the process proceeds to step S402 from step S401. In the case of first power supply to the electronic apparatus 200, the CPU 105 may transmit the information about the value of the first power to the electronic apparatus 200 via the power supply antenna 108.

In step S402, the CPU 105 calculates the VSWR based on the information about the amplitude voltage V1 of the traveling wave detected by the reflected power detection circuit 114, and the information about the amplitude voltage V2 of the reflected wave detected by the reflected power detection circuit 114. The CPU 105 further records the calculated VSWR on the RAM 107. Then, the process proceeds to step S403 from step S402. The VSWR calculated by the CPU 105 in step S402 is hereinafter referred to as "VSWR1."

In step S403, the CPU 105 controls the modulation and demodulation circuit 104 to transmit to the electronic apparatus 200 a first command for requesting the electronic apparatus 200 for the status information. Then, the process proceeds to step S404 from step S403.

Upon reception of the first command, the electronic apparatus 200 detects the predetermined values A and B and the predetermined time period T, and transmits the detected status information of the electronic apparatus 200 to the power supply apparatus 100 as a response to the first command.

In step S404, the CPU 105 determines whether the modulation and demodulation circuit 104 has received the status information of the electronic apparatus 200 as a response to the first command transmitted to the electronic apparatus 200 in step S403.

When the CPU 105 determines that the modulation and demodulation circuit 104 has received the status information of the electronic apparatus 200 (YES in step S404), the CPU 105 acquires the status information of the electronic apparatus 200 from the modulation and demodulation circuit 104, and records the status information on the RAM 107, and the process proceeds to step S405 from step S404.

When the CPU 105 determines that the modulation and demodulation circuit 104 has not received the status information of the electronic apparatus 200 (NO in step S404), the process proceeds to step S411 from step S404.

In step S405, the CPU 105 determines whether the operating state of the electronic apparatus 200 has been changed based on the status information of the electronic apparatus 200 acquired in step S404.

The CPU 105 determines whether the operating state of the electronic apparatus 200 has been changed by comparing the status information of the electronic apparatus 200 acquired in step S404 with the status information of the electronic apparatus 200 acquired before execution of the process in step S403.

When the information included in the status information of the electronic apparatus 200 acquired in step S404 corresponds to the information included in the status information of the electronic apparatus 200 acquired before execution of the process in step S403, the CPU 105 determines that the operating state of the electronic apparatus 200 is unchanged. When the information included in the status information of the electronic apparatus 200 acquired in step S404 does not correspond to the information included in the status information of the electronic apparatus 200 acquired before execution of the process in step S403, the CPU 105 determines that the operating state of the electronic apparatus 200 has been changed. When the status information of the electronic apparatus 200 is acquired in step S404 but not acquired before execution of the process in step S403, the CPU 105 similarly determines that the operating state of the electronic apparatus 200 has been changed.

When the CPU 105 determines that the operating state of the electronic apparatus 200 is unchanged (NO in step S405), the process proceeds to step S407 from step S405.

The case where the CPU 105 determines that the operating state of the electronic apparatus 200 remains unchanged (NO in step S405) refers to a case where the predetermined values A and B and the predetermined time period T included in the status information acquired in step S404 have not been changed.

When the CPU 105 determines that the operating state of the electronic apparatus 200 has been changed (YES in step S405), the process proceeds to step S406 from step S405.

The case where the CPU 105 determines that the operating state of the electronic apparatus 200 has been changed (YES in step S405) refers to a case where at least any one of the predetermined values A and B and the predetermined time period T included in the status information acquired in step S404 has been changed.

In step S406, the CPU 105 sets the predetermined time T and the predetermined values A and B based on the status information of the electronic apparatus 200 acquired therefrom in step S404. The predetermined values A and B set by the CPU 105 are threshold values used to detect a foreign object. The predetermined time period T set by the CPU 105 is a threshold value of the time period during which the first command is not transmitted.

For example, when the status information of the electronic apparatus 200 acquired therefrom in step S404 includes a predetermined time period T1, a predetermined value A1, and a predetermined value B1, the CPU 105 sets the predetermined time period T to T1, sets the predetermined value A to A1, and sets the predetermined value B to B1.

The predetermined time T and the predetermined values A and B set by the CPU 105 in step S406 are recorded on the RAM 107. The CPU 105 controls the timer 109 to measure a time period elapsed since the predetermined time period T as well as the predetermined values A and B were set. The information about the time period measured by the timer 109 is recorded on the RAM 107.

When the predetermined time T and the predetermined values A and B are set by the CPU 105, the process proceeds to step S407 from step S406.

The amplitude voltage V2 of the reflected wave detected by the reflected power detection circuit 114 when one electronic apparatus 200 exists within the predetermined range is greater than that when the electronic apparatus 200 does not exist within the predetermined range. Accordingly, the VSWR detected by the CPU 105 when one electronic apparatus 200 exists within the predetermined range is greater than that when one electronic apparatus 200 does not exist within the predetermined range.

Similarly, the amplitude voltage V2 of the reflected wave detected by the reflected power detection circuit 114 when two electronic apparatuses 200 exist within the predetermined range is also greater than that when one electronic apparatus 200 exists within the predetermined range. Accordingly, the VSWR detected by the CPU 105 when two electronic apparatuses 200 exist within the predetermined range is greater than that when one electronic apparatus 200 exists within the predetermined range.

The VSWR detected by the CPU 105 when a foreign object exists within a predetermined range of distance from the power supply apparatus 100 changes more rapidly than that does when the electronic apparatus 200 is newly placed within the predetermined range, because of the influences of the foreign object.

Thus, the CPU 105 detects whether a foreign object exists within the predetermined range according to whether a change amount of the VSWR is greater than a value indicating a change amount of the VSWR when the electronic apparatus 200 is newly placed within the predetermined range.

In step S407, therefore, the CPU 105 calculates the VSWR based on the amplitude voltage V1 of the traveling wave and the amplitude voltage V2 of the reflected wave detected by the reflected power detection circuit 114. The VSWR calculated by the CPU 105 in step S407 is hereinafter referred to as "VSWR2." The CPU 105 calculates a change amount M of the VSWR based on a difference between VSWR1 and VSWR2. The CPU 105 compares the change amount M of the calculated VSWR with the predetermined value A set by the CPU 105. The predetermined value A corresponds to the value indicating a change amount of the VSWR when the electronic apparatus 200 is placed within the predetermined range.

The CPU 105 further determines whether the change amount M of the VSWR is equal to or greater than the predetermined value A. The predetermined value A compared with the change amount M of the VSWR in step S407 is the value set by the CPU 105 based on the status information of the electronic apparatus 200. When the CPU 105 determines that the operating state of the electronic apparatus 200 has been changed (YES in step S405), the predetermined value A is the value set by the CPU 105 in step S406.

When the CPU 105 determines that the change amount M of the VSWR is equal to or greater than the predetermined value A (YES in step S407), the CPU 105 detects that a foreign object and the electronic apparatus 200 exist within the predetermined range, and the process proceeds to step S411 from step S407.

When the CPU 105 determines that the change amount M of the VSWR is smaller than the predetermined value A (NO in step S407), the process proceeds to step S408 from step S407.

The amplitude voltage V2 of the reflected wave detected by the reflected power detection circuit 114 when a foreign object exists within the predetermined range of distance from the power supply apparatus 100 increases more rapidly than that does when one electronic apparatus 200 exists within the predetermined range, because of the influences of the foreign object.

Accordingly, the VSWR detected by the CPU 105 when a foreign object exists within the predetermined range of distance from the power supply apparatus 100 increases more rapidly than that does when one electronic apparatus 200 exists within the predetermined range, because of the influence of the foreign object.

Thus, the CPU 105 detects whether a foreign object exists within the predetermined range according to whether the VSWR is greater than a value indicating the VSWR when the electronic apparatus 200 is placed within the predetermined range.

In step S408, therefore, the CPU 105 compares the VSWR2 calculated in step S407 with the predetermined value B set by the CPU 105. The predetermined value B corresponds to the value indicating the VSWR when the electronic apparatus 200 is placed within the predetermined range.

The CPU 105 further determines whether the VSWR2 is equal to or greater than the predetermined value B. The predetermined value B compared with the VSWR2 in step S408 is the value set by the CPU 105 in the status information of the electronic apparatus 200. When the CPU 105 determines that the operating state of the electronic apparatus 200 has been changed (YES in step S405), the predetermined value B is the value set by the CPU 105 in step S406.

When the CPU 105 determines that the VSWR2 is equal to or greater than the predetermined value B (YES in step S408), the CPU 105 detects that a foreign object and the electronic apparatus 200 exist within the predetermined range, and the process proceeds to step S411 from step S408.

When the CPU 105 determines that the VSWR2 is smaller than the predetermined value B (NO in step S408), the process proceeds to step S409 from step S408.

When at least either one of the operating state and the movement distance of the electronic apparatus 200 changes, the amplitude voltage V2 of the reflected wave detected by the reflected power detection circuit 114 changes according to a change in the operating state of the electronic apparatus 200. Accordingly, the VSWR calculated by the CPU 105 also changes.

There has been a case where, even when no foreign object exists within the predetermined range, the CPU 105 incorrectly detects the existence of a foreign object within the predetermined range according to a change amount of the VSWR accompanying the change in the operating state of the electronic apparatus 200.

In such a case, to correctly detect whether a foreign object exists within the predetermined range, the CPU 105 needs, when the operating state of the electronic apparatus 200 changes, to execute the process in step S407 by using the predetermined value A corresponding to the operating state of the electronic apparatus 200 after the state changes. To correctly detect whether a foreign object exists within the predetermined range, the CPU 105 needs, when the operating state of the electronic apparatus 200 changes, to execute the process in step S408 by using the predetermined value B corresponding to the operating state of the electronic apparatus 200 after the state changes.

Therefore, even when the predetermined values A and B have already been set based on the status information of the electronic apparatus 200, the CPU 105 needs to periodically acquire the status information of the electronic apparatus 200 and reset the predetermined values A and B based on the status information of the electronic apparatus 200.

When the electronic apparatus 200 is in a state where the VSWR rapidly changes, the CPU 105 needs to execute the process in step S407 by using the exact predetermined value A corresponding to the operating state of the electronic apparatus 200, and to execute the process in step S408 by using the exact predetermined value B corresponding to the operating state of the electronic apparatus 200.

In step S406, therefore, the CPU 105 resets the time period during which the status information of the electronic apparatus 200 is acquired therefrom according to the predetermined time period T included in the status information of the electronic apparatus 200. When the predetermined time period T set in step S406 has elapsed, the CPU 105 reacquires the status information of the electronic apparatus 200.

In step S409, the CPU 105 determines whether the time period measured by the timer 109 in step S406 has reached the predetermined time period T.

The predetermined time period T compared with the time period measured by the timer 109 in step S409 is the value set by the CPU 105 based on the status information of the electronic apparatus 200. When the CPU 105 determines that the operating state of the electronic apparatus 200 has been changed (YES in step S405), the predetermined time period T is the value set by the CPU 105 in step S406.

When the CPU 105 determines that the time period measured by the timer 109 has reached the predetermined time period T (YES in step S409), the CPU 105 determines that the predetermined time period T has elapsed, and the process returns to step S402 from step S409. In this case (YES in step S409), the CPU 105 further controls the timer 109 to stop time measurement.

When the CPU 105 determines that the time period measured by the timer 109 has reached the predetermined time period T (YES in step S409), the CPU 105 executes again the process in steps S402, S403, and S404 to reacquire the status information of the electronic apparatus 200.

Even when the CPU 105 has already set the predetermined time period T, the CPU 105 needs to reset the predetermined time period T based on the status information of the electronic apparatus 200. To do this, the CPU periodically acquires the status information of the electronic apparatus 200 to acquire the predetermined values A and B and the predetermined time period T from the electronic apparatus 200.

When the CPU 105 determines that the time period measured by the timer 109 has not reached the predetermined time period T (NO in step S409), the CPU 105 determines that the predetermined time period T has not elapsed, and the process proceeds to step S410 from step S409.

In step S410, the CPU 105 determines whether the process for supplying the power to the electronic apparatus 200 is to be stopped.

The CPU 105 may determine whether the process for supplying the power to the electronic apparatus 200 is to be stopped, for example, by determining whether an error has occurred in the power supply apparatus 100. When the CPU 105 determines that an error has occurred in the power supply apparatus 100, the CPU 105 determines that the process for supplying the power to the electronic apparatus 200 is to be stopped (YES in step S410). When the CPU 105 determines that an error has not occurred in the power supply apparatus 100, the CPU 105 determines that the process for supplying the power to the electronic apparatus 200 is not to be stopped (NO in step S410).

For example, when the electronic apparatus 200 is charging the battery 210, the CPU 105 may determine whether the process for supplying the power to the electronic apparatus 200 is to be stopped by determining whether the battery 210 is fully charged. When the CPU 105 determines that the battery 210 is fully charged, the CPU 105 determines that the process for supplying the power to the electronic apparatus 200 is to be stopped (YES in step S410). When the CPU 105 determines that the battery 210 is not fully charged, the CPU 105 determines that the process for supplying the power to the electronic apparatus 200 is not to be stopped (NO in step S410).

The CPU 105 may determine whether the battery 210 is fully charged by transmitting to the electronic apparatus 200 a command for requesting the information about the remaining capacity of the battery 210 and then receiving from the electronic apparatus 200 a response to the command.

For example, the CPU 105 may determine whether the process for supplying the power to the electronic apparatus 200 is to be stopped by determining whether an error has occurred in the electronic apparatus 200. When the CPU 105 determines that error information has been received from the electronic apparatus 200, the CPU 105 determines that the process for supplying the power to the electronic apparatus 200 is to be stopped (YES in step S410). When the CPU 105 determines that the error information is not received from the electronic apparatus 200, the CPU 105 determines that the process for supplying the power to the electronic apparatus 200 is not to be stopped (NO in step S410).

For example, the CPU 105 may determine whether the process for supplying the power to the electronic apparatus 200 is to be stopped by determining whether the removal of the electronic apparatus 200 from within the predetermined range has been detected. When the CPU 105 determines that the removal of the electronic apparatus 200 from within the predetermined range has been detected, the CPU 105 determines that the process for supplying the power to the electronic apparatus 200 is to be stopped (YES in step S410). When the CPU 105 determines that the removal of the electronic apparatus 200 from within the predetermined range has not been detected, the CPU 105 determines that the process for supplying the power to the electronic apparatus 200 is not to be stopped (NO in step S410). The CPU 105 may determine whether the electronic apparatus 200 has been removed from within the predetermined range by transmitting a command for checking that the electronic apparatus 200 exists within the predetermined range to the electronic apparatus 200 and receiving therefrom a response to the command.

For example, the CPU 105 may determine whether the process for supplying the power to the electronic apparatus 200 is to be stopped by determining the necessity of supplying the power to the electronic apparatus 200. In this case, the CPU 105 may inquire the electronic apparatus 200 of whether it is connected with the AC power source (not illustrated). The CPU 105 may further inquire the electronic apparatus 200 of whether the battery 210 has a sufficient remaining capacity for the process to be performed by the electronic apparatus 200.

For example, when the CPU 105 determines that the electronic apparatus 200 is connected with the AC power source (not illustrated), the CPU 105 determines that the process for supplying the power to the electronic apparatus 200 is to be stopped (YES in step S410). Even when the CPU 105 determines that the electronic apparatus 200 is not connected with the AC power source (not illustrated), when the battery 210 has a sufficient remaining capacity, the CPU 105 determines that the process for supplying the power to the electronic apparatus 200 is to be stopped (YES in step S410).

When the CPU 105 determines that the electronic apparatus 200 is not connected with the AC power source (not illustrated), when the battery 210 does not have a sufficient remaining capacity, the CPU 105 determines that the process for supplying the power to the electronic apparatus 200 is not to be stopped (NO in step S410).

When the CPU 105 determines that the process for supplying the power to the electronic apparatus 200 is to be stopped (YES in step S410), the process proceeds to step S411 from step S410. When the CPU 105 determines that the process for supplying the power to the electronic apparatus 200 is not to be stopped (NO in step S410), the process proceeds to step S414 from step S410.

In step S411, the CPU 105 controls any one of the oscillator 101, the power transmission circuit 102, and the matching circuit 103 to stop power supply to the electronic apparatus 200. When the power transmission circuit 102 is generating the first power, the CPU 105 controls any one of the oscillator 101, the power transmission circuit 102, and the matching circuit 103 to stop first power supply to the electronic apparatus 200. When the power transmission circuit 102 is generating the second power, the CPU 105 controls any one of the oscillator 101, the power transmission circuit 102, and the matching circuit 103 to stop second power supply to the electronic apparatus 200. Then, the process proceeds to step S412 from step S411. In step S411, the CPU 105 may stop power supply to the electronic apparatus 200 by controlling the capacitance and inductance values of variable capacitors and variable coils, respectively, included in the matching circuit 103 to stop the resonance between the power supply apparatus 100 and the electronic apparatus 200. In step S411, the CPU 105 may stop power supply to the electronic apparatus 200 by stopping the oscillation of the oscillator 101. In step S411, the CPU 105 may stop power supply to the electronic apparatus 200 by stopping the power generation by the power transmission circuit 102.

In step S412, the CPU 105 controls the display unit 113 to display data indicating the operating state of the power supply apparatus 100.

For example, when the CPU 105 detects that the battery 210 of the electronic apparatus 200 is fully charged in step S410, the CPU 105 may display on the display unit 113 data indicating that the fully charged state of the electronic apparatus 200 has been detected as the data indicating the operating state of the power supply apparatus 100.

When a foreign object is detected in step S407, the CPU 105 may display on the display unit 113 data indicating that the existence of the foreign object in the vicinity of the power supply apparatus 100 has been detected as the data indicating the operating state of the power supply apparatus 100.

When a foreign object is detected in step S408, the CPU 105 may display on the display unit 113 data indicating that the existence of the foreign object in the vicinity of the power supply apparatus 100 has been detected as the data indicating the operating state of the power supply apparatus 100.

For example, when the CPU 105 detects an error occurrence in the power supply apparatus 200 in step S410, the CPU 105 may display on the display unit 113 data indicating that the error occurrence in the power supply apparatus 100 has been detected as the data indicating the operating state of the power supply apparatus 100.

For example, when the CPU 105 detects the reception of the error information from the electronic apparatus 200 in step S410, the CPU 105 may display on the display unit 113 data indicating that the error occurrence in the electronic apparatus 200 has been detected as the data indicating the operating state of the power supply apparatus 100.

The CPU 105 may further display on the display unit 113 the information about operations of the power supply apparatus 100 as the data indicating the operating state of the power supply apparatus 100. Then, the process proceeds to step S413 from step S412.

In step S413, the CPU 105 changes the operation mode of the power supply apparatus 100 to the standby mode.

In the standby mode, some operations of the power supply apparatus 100 are not stopped and other operations are stopped. When the power supply apparatus 100 is in the standby mode, operations of at least the CPU 105, the ROM 106, the RAM 107, and the timer 109 are not stopped and operations of other units are stopped.

When the communication unit 112 is receiving video data from the electronic apparatus 200, even when the power supply apparatus 100 has been changed to the standby mode, the CPU 105 does not stop the operation for receiving video data performed by the communication unit 112. Similarly, when the communication unit 112 is transmitting video data to the electronic apparatus 200, even when the power supply apparatus 100 has been changed to the standby mode, the CPU 105 does not stop the operation for transmitting video data performed by the communication unit 112. When the display unit 113 is displaying video data, even when the power supply apparatus 100 has been changed to the standby mode, the CPU 105 does not stop the operation for displaying video data performed by the display unit 113. When the recording unit 110 is recording at least either one of moving image and audio data on the recording medium 110a, even when the power supply apparatus 100 has been changed to the standby mode, the CPU 105 does not stop the operation for recording data performed by the recording unit 110.

When the operation mode of the power supply apparatus 100 has been changed to the standby mode, the process ends.

When the operation mode of the power supply apparatus 100 changes to the standby mode, the CPU 105 controls the timer 109 to measure a time period elapsed since the power supply apparatus 100 entered the standby mode. When the time period measured by the timer 109 has reached a predetermined value, the CPU 105 changes the operation mode of the power supply apparatus 100 from the standby mode to either one of the first and second power supply modes, and executes again the process in step S401. Before executing again the process in step S401, the CPU 105 may delete the status information acquired from the electronic apparatus 200 and recorded on the RAM 107 in step S404.

In step S414, the CPU 105 determines whether power supply process is to be started by determining whether an operation for selecting an apparatus subjected to the power supply process is performed via the operation unit 115. The power supply process refers to process performed by the power supply apparatus 100 to supply the second power to a specific apparatus.

For example, when the user performs the operation for selecting the electronic apparatus 200 (YES in step S414), the CPU 105 determines that the power supply process for the electronic apparatus 200 is to be started, and the process proceeds to step S415 from step S414. When the user does not perform the operation for selecting the electronic apparatus 200 and other electronic apparatuses (NO in step S414), the CPU 105 determines that the power supply process is not to be started, and the process returns to step S407 from step S414.

In step S415, the CPU 105 executes the power supply process (described below). When the CPU 105 executes the power supply process, the process ends.

Although the CPU 105 controls the display unit 113 to display data indicating the operating state of the power supply apparatus 100 in step S412, the process is not limited thereto. For example, when the power supply apparatus 100 and an external display apparatus are connected via a digital interface, the CPU 105 may control the external display apparatus to display data indicating the operating state of the power supply apparatus 100.

When the time period measured by the timer 109 has reached the predetermined time period T (YES in step S409), the CPU 105 acquires from the electronic apparatus 200 its status information by executing again the process in steps S402 to S404. When the time period measured by the timer 109 has not reached the predetermined time period T (NO in step S409), the CPU 105 does not execute again the process in steps S402 to S404 until the time period measured by the timer 109 reaches the predetermined time period T.

The power supply process performed by the power supply apparatus 100 in step S415 in the first exemplary embodiment will be described below with reference to the flowchart in FIG. 5. The CPU 105 executes the power supply process (FIG. 5) when the electronic apparatus 200 subjected to power supply is selected by the power supply apparatus 100. The CPU 105 executes the power supply process (FIG. 5) when the power supply apparatus 100 has an operation mode of either one of the first and second power supply modes.

The power supply process will be described below based on an exemplary case where the electronic apparatus 200 is selected by the CPU 105 as an apparatus subjected to power supply. In this case, the power supply apparatus 100 has already acquired from the electronic apparatus 200 the identification information of the electronic apparatus 200 and the device information of the electronic apparatus 200, and that the electronic apparatus 200 exists within the predetermined range of distance from the power supply apparatus 100. The CPU 105 controls the process illustrated in the flowchart in FIG. 5 by executing the computer program stored in the ROM 106.

In step S501, the CPU 105 controls the oscillator 101, the power transmission circuit 102, and the matching circuit 103 to supply the first power to the electronic apparatus 200. Then, the process proceeds to step S502 from step S501.

In step S502, the CPU 105 controls the matching circuit 103 and the modulation and demodulation circuit 104 to transmit to the electronic apparatus 200 a second command for notifying the electronic apparatus 200 about that the process for supplying the second power thereto is to be started. Then, the process proceeds to step S503 from step S502.

In step S503, the CPU 105 determines whether the modulation and demodulation circuit 104 has received a response to the second command transmitted to the electronic apparatus 200 in step S502.

When the CPU 105 determines that the modulation and demodulation circuit 104 has received a response to the second command (YES in step S503), the CPU 105 determines that the electronic apparatus 200 has been changed to a mode for receiving the second power supplied from the power supply apparatus 100, and the process proceeds to step S504 from step S503.

When the CPU 105 determines that the modulation and demodulation circuit 104 has not received a response to the second command (NO in step S503), the CPU 105 determines that the electronic apparatus 200 has not been changed to a mode for receiving the second power supplied from the power supply apparatus 100, and the process proceeds to step S516 from step S503.

In step S504, the CPU 105 controls the oscillator 101, the power transmission circuit 102, and the matching circuit 103 to supply the second power to the electronic apparatus 200 via the power supply antenna 108.

In the case of second power supply to the electronic apparatus 200, the CPU 105 may transmit the information about the value of the second power to the electronic apparatus 200 via the power supply antenna 108.

The CPU 105 sets the second power based on power receiving information of the electronic apparatus 200 included in the device information acquired from the electronic apparatus 200. The CPU 105 sets the second power so as to be equal to or greater than the value of the minimum power receivable from the power supply apparatus 100 by the electronic apparatus 200 and to be equal to or smaller than the value of the maximum power receivable from the power supply apparatus 100 by the electronic apparatus 200.

When the CPU 105 has acquired the status information of the electronic apparatus 200 in step S404, the second power may be set based on the status information of the electronic apparatus 200. When the status information of the electronic apparatus 200 includes the information about the operating state of the electronic apparatus 200, the CPU 105 sets the second power to supply to the electronic apparatus 200 the power necessary for operations and process performed by the electronic apparatus 200.

The CPU 105 may further set the second power based on the information about the power necessary for the electronic apparatus 200 to operate the communication unit 212, included in the power receiving information of the electronic apparatus 200. The CPU 105 may further set the second power based on the information about the power necessary for the electronic apparatus 200 to charge the battery 210, included in the power receiving information of the electronic apparatus 200. The CPU 105 may further set the second power based on the information about the power necessary for the electronic apparatus 200 to operate the imaging unit 213, included in the power receiving information of the electronic apparatus 200. The CPU 105 may further set the second power based on the information about the power necessary for the electronic apparatus 200 to operate the recording unit 217, included in the power receiving information of the electronic apparatus 200. Then, the process proceeds to step S505 from step S504.

In step S505, the CPU 105 calculates the VSWR based on the information about the amplitude voltage V1 of the traveling wave and the information about the amplitude voltage V2 of the reflected wave detected by the reflected power detection circuit 114. The CPU 105 further records the calculated VSWR on the RAM 107. Then, the process proceeds to step S506 from step S505. The VSWR calculated by the CPU 105 in step S505 is hereinafter referred to as "VSWR3."

In step S506, the CPU 105 calculates the VSWR based on the amplitude voltage V1 of the traveling wave and the amplitude voltage V2 of the reflected wave acquired from the reflected power detection circuit 114. The VSWR calculated by the CPU 105 in step S506 is hereinafter referred to as "VSWR4." The CPU 105 compares the VSWR3 with the VSWR4 to calculate the change amount M of the VSWR.

Similar to step S407, the CPU 105 further determines whether the change amount M of the VSWR calculated in step S506 is equal to or greater than the predetermined value A. The predetermined value A is the value set by the CPU 105 in step S406.

When the CPU 105 determines that the change amount M of the VSWR is equal to or greater than the predetermined value A (YES in step S506), the CPU 105 detects that of a foreign object and the electronic apparatus 200 exist within the predetermined range, and the process proceeds to step S516 from step S506.

When the CPU 105 determines that the change amount M of the VSWR is smaller than the predetermined value A (NO in step S506), the process proceeds to step S507, from step S506.

In step S507, similar to step S408, the CPU 105 determines whether the VSWR4 calculated in step S506 is equal to or greater than the predetermined value B. The predetermined value B is the value set by the CPU 105 in step S406.

When the CPU 105 determines that the VSWR4 is equal to or greater than the predetermined value B (YES in step S507), the CPU 105 detects that a foreign object and the electronic apparatus 200 exist within the predetermined range, and the process proceeds to step S516 from step S507.

When the CPU 105 determines that the VSWR4 is smaller than the predetermined value B (NO in step S507), the process proceeds to step S508 from step S507.

In step S508, similar to step S409, the CPU 105 determines whether the time period measured by the timer 109 in step S406 has reached the predetermined time period T.

When the CPU 105 determines that the time period measured by the timer 109 has reached the predetermined time period T (YES in step S508), the CPU 105 determines that the predetermined time period T has elapsed, and the process proceeds to step S509 from step S508. In this case (YES in step S508), the CPU 105 further controls the timer 109 to stop time measurement.

When the CPU 105 determines that the time period measured by the timer 109 has not reached the predetermined time period T (NO in step S508), the CPU 105 determines that the predetermined time period T has not elapsed, and the process proceeds to step S514 from step S508.

In step S509, the CPU 105 controls the oscillator 101, the power transmission circuit 102, and the matching circuit 103 to supply the first power to the electronic apparatus 200. Then, the process proceeds to step S510 from step S509.

When the CPU 105 determines that the time period measured by the timer 109 has reached the predetermined time period T (YES in step S508), the CPU 105 acquires the status information of the electronic apparatus 200, and acquires the predetermined values A and B and the predetermined time period T from the electronic apparatus 200.

In step S510, therefore, the CPU 105 controls the modulation and demodulation circuit 104 to transmit the first command to the electronic apparatus 200. Then, the process proceeds to step S511 from step S510.

In step S511, the CPU 105 determines whether the modulation and demodulation circuit 104 has received the status information of the electronic apparatus 200 as a response to the first command transmitted to the electronic apparatus 200 in step S510.

When the CPU 105 determines that the modulation and demodulation circuit 104 has received the status information of the electronic apparatus 200 (YES in step S511), the process proceeds to step S512 from step S511.

When the CPU 105 determines that the modulation and demodulation circuit 104 has not received the status information of the electronic apparatus 200 (NO in step S511), the process proceeds to step S516 from step S511.

In step S512, the CPU 105 determines whether the operating state of the electronic apparatus 200 has been changed based on the status information of the electronic apparatus 200 acquired in step S404 and the status information of the electronic apparatus 200 acquired in step S511.

The CPU 105 determines whether the operating state of the electronic apparatus 200 has been changed by comparing the status information of the electronic apparatus 200 acquired in step S404 with the status information of the electronic apparatus 200 acquired in step S511.

When the information included in the status information of the electronic apparatus 200 acquired in step S404 corresponds to the information included in the status information of the electronic apparatus 200 acquired in step S511, the CPU 105 determines that the operating state of the electronic apparatus 200 is unchanged. When the information included in the status information of the electronic apparatus 200 acquired in step S404 does not correspond to the information included in the status information of the electronic apparatus 200 acquired in step S511, the CPU 105 determines that the operating state of the electronic apparatus 200 has been changed.

When the CPU 105 determines that the operating state of the electronic apparatus 200 is unchanged (NO in step S512), the process proceeds to step S514 from step S512.

When the CPU 105 determines that the operating state of the electronic apparatus 200 has been changed (YES in step S512), the process proceeds to step S513 from step S512.

In step S513, similar to step S406, the CPU 105 sets the predetermined time T and the predetermined values A and B based on the status information of the electronic apparatus 200 acquired therefrom in step S511.

For example, when the status information of the electronic apparatus 200 acquired therefrom in step S511 includes a predetermined time period T2, a predetermined value A2, and a predetermined value B2, the CPU 105 sets the predetermined time period T to T2, sets the predetermined value A to A2, and sets the predetermined value B to B2.

The predetermined time T and the predetermined values A and B set by the CPU 105 in step S513 are recorded on the RAM 107.

The CPU 105 controls the timer 109 to measure a time period elapsed since the predetermined time period T as well as the predetermined values A and B were set. The information about the time period measured by the timer 109 is recorded on the RAM 107. When the predetermined time T and the predetermined values A and B are set by the CPU 105, the process proceeds to step S514 from step S513.

In step S514, similar to step S410, the CPU 105 determines whether the process for supplying the power to the electronic apparatus 200 is to be stopped. When the CPU 105 determines that the process for supplying the power to the electronic apparatus 200 is to be stopped (YES in step S514), the process proceeds to step S515 from step S514.

When the CPU 105 determines that the process for supplying the power to the electronic apparatus 200 is not to be stopped (NO in step S514), the process returns to step S504 from step S514.

In step S515, the CPU 105 controls any one of the oscillator 101, the power transmission circuit 102, and the matching circuit 103 to stop second power supply to the electronic apparatus 200. Then, the process proceeds to step S516 from step S515.

In step S516, the CPU 105 sets the power to be supplied to the electronic apparatus 200 as the first power, and controls the oscillator 101, the power transmission circuit 102, and the matching circuit 103 to supply the first power to the electronic apparatus 200 via the power supply antenna 108. Then, the process proceeds to step S517 from step S516.

In step S517, the CPU 105 controls the modulation and demodulation circuit 104 to transmit to the electronic apparatus 200 a third command for notifying the electronic apparatus 200 about that second power supply to the electronic apparatus 200 is to be stopped. Then, the process proceeds to step S518 from step S517.

In step S518, the CPU 105 determines whether the modulation and demodulation circuit 104 has received a response to the third command transmitted to the electronic apparatus 200 in step S517.

When the CPU 105 determines that the modulation and demodulation circuit 104 has received a response to the third command (YES in step S518), the CPU 105 determines that the end of second power supply performed by the power supply apparatus 100 has been notified to the electronic apparatus 200, and the process proceeds to step S519 from step S518.

When the CPU 105 determines that the modulation and demodulation circuit 104 has not received a response to the third command (NO in step S518), the CPU 105 determines that the end of second power supply performed by the power supply apparatus 100 has not been notified to the electronic apparatus 200. In this case, the CPU 105 controls any one of the oscillator 101, the power transmission circuit 102, and the matching circuit 103 to stop first power supply to the electronic apparatus 200, and the process ends.

In step S519, the CPU 105 controls any one of the oscillator 101, the power transmission circuit 102, and the matching circuit 103 to stop first power supply to the electronic apparatus 200. Then, the process proceeds to step S520 from step S519.

In step S520, similar to step S412, the CPU 105 controls the display unit 113 to display data indicating the operating state of the power supply apparatus 100. Then, the process proceeds to step S521 from step S520.

In step S521, similar to step S413, the CPU 105 changes the operation mode of the power supply apparatus 100 to the standby mode.

When the power supply apparatus 100 has been changed to the standby mode, the process ends.

When the power supply apparatus 100 has been changed to the standby mode, the CPU 105 controls the timer 109 to measure a time period elapsed since the power supply apparatus 100 entered the standby mode. When the time period measured by the timer 109 has reached the predetermined value, the CPU 105 may change the power supply apparatus 100 to the power supply mode from the standby mode, and execute again the process in step S401 or the process in step S501.

When the power transmission circuit 102 is generating the first power in step S521, the CPU 105 controls any one of the oscillator 101, the power transmission circuit 102, and the matching circuits 103 to stop first power supply to the electronic apparatus 200.

The power supply apparatus 100 starts process for supplying second power to the electronic apparatus 200 via the power supply antenna 108 in step S504, and maintains second power supply to the electronic apparatus 200 until the CPU 105 stops second power supply thereto in step S509.

The power supply apparatus 100 starts process for supplying first power supply to the electronic apparatus 200 via the power supply antenna 108 in step S501, and maintains first power supply to the electronic apparatus 200 until the CPU 105 stops first power supply thereto in step S504.

The power supply apparatus 100 starts process for supplying first power to the electronic apparatus 200 via the power supply antenna 108 in step S509, and maintains first power supply to the electronic apparatus 200 until the CPU 105 stops first power supply thereto in step S504.

The power supply apparatus 100 starts process for supplying first power supply to the electronic apparatus 200 via the power supply antenna 108 in step S516 or S509, and maintains first power supply to the electronic apparatus 200 until the CPU 105 stops first power supply thereto in step S519.

State information acquisition process performed by the power supply apparatus 100 according to the first exemplary embodiment will be described below with reference to the flowchart in FIG. 6. The CPU 105 executes the status information acquisition process (FIG. 6) when the power supply apparatus 100 supplies either one of the first and second power to the electronic apparatus 200. The CPU 105 executes the status information acquisition process (FIG. 6) when the power supply apparatus 100 has an operation mode of either one of the first and second power supply modes. The CPU 105 controls the process illustrated in the flowchart in FIG. 6 by executing the computer program stored in the ROM 106.

The status information acquisition process will be described below based on an exemplary case where the power supply apparatus 100 performs the status information acquisition process to the electronic apparatus 200. In this case, the power supply apparatus 100 has already acquired from the electronic apparatus 200 the identification information of the electronic apparatus 200, the device information of the electronic apparatus 200, and the power receiving information of the electronic apparatus 200, and that the electronic apparatus 200 exists within the predetermined range of distance from the power supply apparatus 100.

In step S601, the CPU 105 determines whether the modulation and demodulation circuit 104 has received information from the electronic apparatus 200.

When the CPU 105 determines that the modulation and demodulation circuit 104 has received the information from the electronic apparatus 200 (YES in step S601), the process proceeds to step S602 from step S601.

When the CPU 105 determines that the modulation and demodulation circuit 104 has not received the information from the electronic apparatus 200 (NO in step S601), the process ends.

In step S602, the CPU 105 determines whether the information received from the electronic apparatus 200 by the modulation and demodulation circuit 104 in step S601 is the status information.

When the CPU 105 determines that the information received from the electronic apparatus 200 by the modulation and demodulation circuit 104 is the status information (YES in step S602), the process proceeds to step S603 from step S602. When the CPU 105 determines that the information received from the electronic apparatus 200 by the modulation and demodulation circuit 104 is not the status information (NO in step S602), the process ends.

In step S603, the CPU 105 determines whether the operating state of the electronic apparatus 200 has been changed based on the status information of the electronic apparatus 200 received therefrom before execution of the process in step S602 and the status information of the electronic apparatus 200 received therefrom in step S602. When the information included in the status information of the electronic apparatus 200 received before execution of the process in step S602 corresponds to the information included in the status information of the electronic apparatus 200 received in step S602, the CPU 105 determines that the operating state of the electronic apparatus 200 is unchanged. When the information included in the status information of the electronic apparatus 200 received before execution of the process in step S602 does not correspond to the information included in the status information of the electronic apparatus 200 received in step S602, the CPU 105 determines that the operating state of the electronic apparatus 200 has been changed.

When the CPU 105 determines that the operating state of the electronic apparatus 200 is unchanged (NO in step S603), the process ends.

When the CPU 105 determines that the operating state of the electronic apparatus 200 has been changed (YES in step S603), the process proceeds to step S604 from step S603.

In step S604, similar to step S406, the CPU 105 sets the predetermined time T and the predetermined values A and B based on the status information of the electronic apparatus 200 acquired therefrom in step S602.

For example, when the status information of the electronic apparatus 200 received therefrom in step S602 includes a predetermined time period T3, a predetermined value A3, and a predetermined value B3, the CPU 105 sets the predetermined time period T to T3, sets the predetermined value A to A3, and sets the predetermined value B to B3.

In step S604, the predetermined time T and the predetermined values A and B set by the CPU 105 are recorded on the RAM 107.

The CPU 105 controls the timer 109 to measure a time period elapsed since the predetermined time period T as well as the predetermined values A and B were set. The information about the time period measured by the timer 109 is recorded on the RAM 107. When predetermined time T and the predetermined values A and B are set by the CPU 105, the process ends.

When the status information of the electronic apparatus 200 has been acquired (YES in step S602) and when the operating state of the electronic apparatus 200 has been changed (YES in step S603), the CPU 105 executes the foreign object detection process (FIG. 4) by using the predetermined values A and B and the predetermined time period T set in step S604. When the status information of the electronic apparatus 200 has been acquired (YES in step S602) and when the operating state of the electronic apparatus 200 has been changed (YES in step S603), the CPU 105 executes the power supply process (FIG. 5) by using the predetermined values A and B and the predetermined time period T set in step S604.

Even when the CPU 105 is executing the foreign object detection process (FIG. 4) or the power supply process (FIG. 5), when the CPU 105 detects that the modulation and demodulation circuit 104 has acquired the information supplied from the electronic apparatus 200, the CPU 105 executes the status information acquisition process (FIG. 6).

For example, even when the power supply apparatus 100 cannot transmit the first command to the electronic apparatus 200, the CPU 105 executes the status information acquisition process (FIG. 6) to enable the power supply apparatus 100 to acquire the status information from the electronic apparatus 200.

For example, even when the power supply apparatus 100 is supplying the second power to the electronic apparatus 200, the CPU 105 executes the status information acquisition process (FIG. 6) to enable the power supply apparatus 100 to acquire the status information from the electronic apparatus 200.

The status information transmission process performed by the electronic apparatus 200 according to the first exemplary embodiment will be described below with reference to the flowchart in FIG. 7. The electronic apparatus 200 performs the status information transmission process (FIG. 7). The CPU 205 controls the process illustrated in the flowchart in FIG. 7 by executing the computer program stored in the ROM 206. The CPU 205 executes the status information transmission process on the premise that either one of the first and second power is being supplied from the power supply apparatus 100 to the electronic apparatus 200. The CPU 205 may periodically execute the status information transmission process (FIG. 7).

In step S701, the CPU 205 determines whether the modulation and demodulation circuit 204 has received the first command from the power supply apparatus 100. When the CPU 205 determines that the modulation and demodulation circuit 204 has not received the first command from the power supply apparatus 100 (NO in step S701), the process proceeds to step S705 from step S701. When the CPU 205 determines that the modulation and demodulation circuit 204 has received the first command from the power supply apparatus 100 (YES in step S701), the process proceeds to step S702 from step S701.

In step S702, the CPU 205 detects the information about the operating state of the electronic apparatus 200 to transmit the status information of the electronic apparatus 200 to the power supply apparatus 100 in response to the first command.

The CPU 205 detects the current operation mode of the electronic apparatus 200 to detect where in the electronic apparatus 200 the regulator 208 is supplying the power to.

Based on a result of the detection, the CPU 205 detects the operation mode of the electronic apparatus 200, and the operation and process currently being performed by the electronic apparatus 200.

The CPU 205 further detects the information about the power consumed by the power supply apparatus 100 based on the current information and voltage information detected by the current and voltage detection unit 214. Based on a result of the detection, the CPU 205 may detect the operation mode of the electronic apparatus 200 corresponding to the power consumption and the operation and process currently being performed by the electronic apparatus 200. The CPU 205 may detect the information about the operating state of the electronic apparatus 200 by using methods other than the above-mentioned method. When the CPU 205 detects the information about the operating state of the electronic apparatus 200, the CPU 205 records the detected information about the operating state of the electronic apparatus 200 on the RAM 207. Then, the process proceeds to step S703 from step S702.

In step S703, the CPU 205 detects the information about the movement distance of the electronic apparatus 200 to transmit the status information of the electronic apparatus 200 to the power supply apparatus 100 in response to the first command.

The CPU 205 detects the information about the movement distance of the electronic apparatus 200 based on the information supplied from the sensor 216. When the CPU 205 detects the information about the movement distance of the electronic apparatus 200, the CPU 205 records the detected information about the movement distance of the electronic apparatus 200 on the RAM 207. Then, the process proceeds to step S704 from step S703.

In step S704, the CPU 205 detects the status information of the electronic apparatus 200, and controls the modulation and demodulation circuit 204 to perform load modulation to transmit the detected status information of the electronic apparatus 200 to the power supply apparatus 100.

In step S704, the CPU 205 detects the predetermined value A corresponding to the operating state of the electronic apparatus 200 by using the information about the operating state of the electronic apparatus 200 detected in step S702, the information about the movement distance of the electronic apparatus 200 detected in step S703, and the first table. The CPU 205 further detects the predetermined value B corresponding to the operating state of the electronic apparatus 200 by using the information about the operating state of the electronic apparatus 200 detected in step S702, the information about the movement distance of the electronic apparatus 200 detected in step S703, and the second table. The CPU 205 further detects the predetermined time period T corresponding to the operating state of the electronic apparatus 200 by using the information about the operating state of the electronic apparatus 200 detected in step S702, the information about the movement distance of the electronic apparatus 200 detected in step S703, and the third table.

When the CPU 205 detects the predetermined values A and B and the predetermined time period T, the CPU 205 controls the modulation and demodulation circuit 204 to perform load modulation to transmit the status information including the predetermined values A and B and a predetermined time period C to the power supply apparatus 100, and the process ends.

The status information of the electronic apparatus 200 transmitted to the power supply apparatus 100 in step S704 may further include the information about the operating state of the electronic apparatus 200 detected in step S702 in addition to the predetermined values A and B and the predetermined time period T. The status information of the electronic apparatus 200 transmitted to the power supply apparatus 100 in step S704 may further include the information about the movement distance of the electronic apparatus 200 detected in step S703.

When the CPU 205 determines that the first command has been received (YES in step S701), the CPU 205 transmits, in step S704, to the power supply apparatus 100 the status information of the electronic apparatus 200 as a response to the first command transmitted from the power supply apparatus 100.

In step S705, the CPU 205 determines whether the operating state of the electronic apparatus 200 has been changed. For example, when the electronic apparatus 200 is operating in the charging mode, when the user inputs via the operation unit 218 an instruction for changing the operation mode of the electronic apparatus 200 from the charging mode to other modes, the CPU 205 determines that the operating state of the electronic apparatus 200 has been changed. For example, when trickle charge is being performed while the electronic apparatus 200 is operating in the charging mode, when the user inputs via the operation unit 218 an instruction for instructing the electronic apparatus 200 to perform boost charge, the CPU 205 determines that the operating state of the electronic apparatus 200 has been changed. Thus, when the user inputs via the operation unit 218 an instruction for changing the operation mode of the electronic apparatus 200 to a mode different from the current mode, the CPU 205 determines that the operating state of the electronic apparatus 200 has been changed. Even when the operation mode of the electronic apparatus 200 is unchanged, when the user inputs via the operation unit 218 an instruction for performing process different from the process currently being performed by the electronic apparatus 200, the CPU 205 determines that the operating state of the electronic apparatus 200 has been changed.

When the operation mode of the electronic apparatus 200 is unchanged and when the process currently being performed by the electronic apparatus 200 is continued, the CPU 205 determines that the operating state of the electronic apparatus 200 is unchanged.

When the CPU 205 determines that the operating state of the electronic apparatus 200 has been changed (YES in step S705), the process proceeds to step S702 from step S705. When the CPU 205 determines that the operating state of the electronic apparatus 200 is unchanged (NO in step S705), the process proceeds to step S706 from step S705.

When the CPU 205 determines that the operating state of the electronic apparatus 200 has been changed (YES in step S705), even when the electronic apparatus 200 has not received the first command from the power supply apparatus 100, the CPU 205 transmits, in step S704, the status information of the electronic apparatus 200 to the power supply apparatus 100.

In step S706, the CPU 205 determines whether the movement distance of the electronic apparatus 200 is equal to or greater than the predetermined value C. The CPU 205 acquires the movement distance of the electronic apparatus 200 based on the information detected by the sensor 216. The predetermined value C indicates the movement distance of the electronic apparatus 200 corresponding to the VSWR detected by the power supply apparatus 100. The predetermined value C is prerecorded on the ROM 206.

When the CPU 205 determines that the movement distance of the electronic apparatus 200 is equal to or greater than the predetermined value C (YES in step S706), the process proceeds to step S702 from step S706.

When the CPU 205 determines that the movement distance of the electronic apparatus 200 is smaller than the predetermined value C (NO in step S706), the process ends.

When the CPU 205 determines that the movement distance of the electronic apparatus 200 is equal to or greater than the predetermined value C (YES in step S706), even when the electronic apparatus 200 has not received the first command from the power supply apparatus 100, the CPU 205 transmits, in step S704, the status information of the electronic apparatus 200 to the power supply apparatus 100. When the CPU 205 determines that the movement distance of the electronic apparatus 200 is smaller than the predetermined value C (NO in step S706), the CPU 205 determines that the operating state of the electronic apparatus 200 is unchanged. When the CPU 205 determines that the movement distance of the electronic apparatus 200 is smaller than the predetermined value C (NO in step S706), even when the electronic apparatus 200 has been moved, the CPU 205 determines that the VSWR detected by the power supply apparatus 100 according to the movement distance of the electronic apparatus 200 is unchanged. Accordingly, the CPU 205 does not transmit the status information of the electronic apparatus 200 to the power supply apparatus 100.

An instruction for changing the operation mode of the electronic apparatus 200 to a mode different from the current mode may be input from a remote controller (not illustrated) for controlling the electronic apparatus 200. An instruction for controlling the electronic apparatus 200 to perform process different from the process currently being performed by the electronic apparatus 200 when its operation mode is unchanged may be input from a remote controller (not illustrated) for controlling the electronic apparatus 200.

Figure 4:
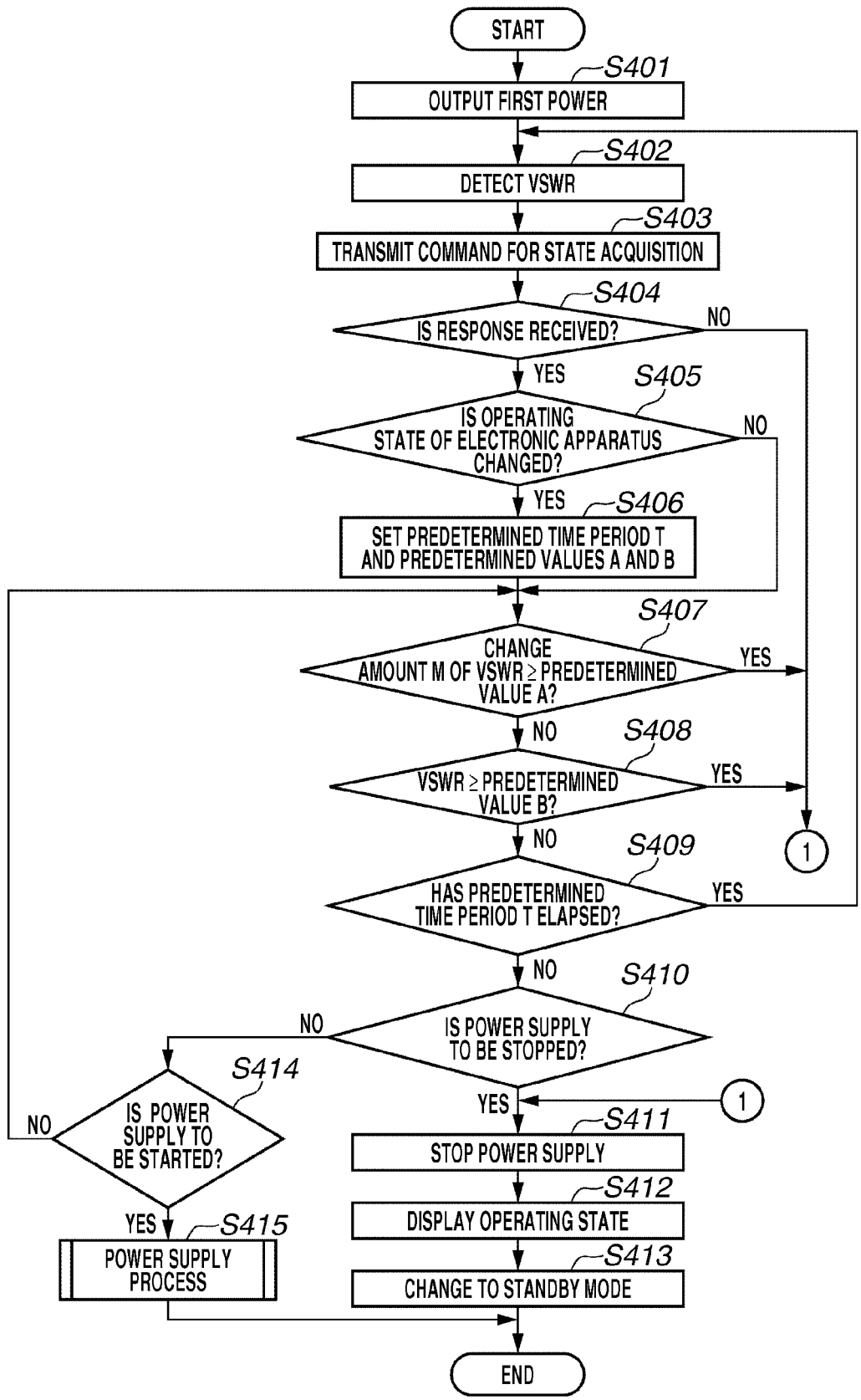
FIG. 4 is a flowchart illustrating exemplary foreign object detection process performed by the power supply apparatus according to the first exemplary embodiment.

Even when the electronic apparatus 200 cannot transmit its status information to the power supply apparatus 100 until the electronic apparatus 200 receives the first command from the power supply apparatus 100, the power supply apparatus 100 can acquire the status information of the electronic apparatus 200 by performing the foreign object detection process (FIG. 4).

Figure 5:
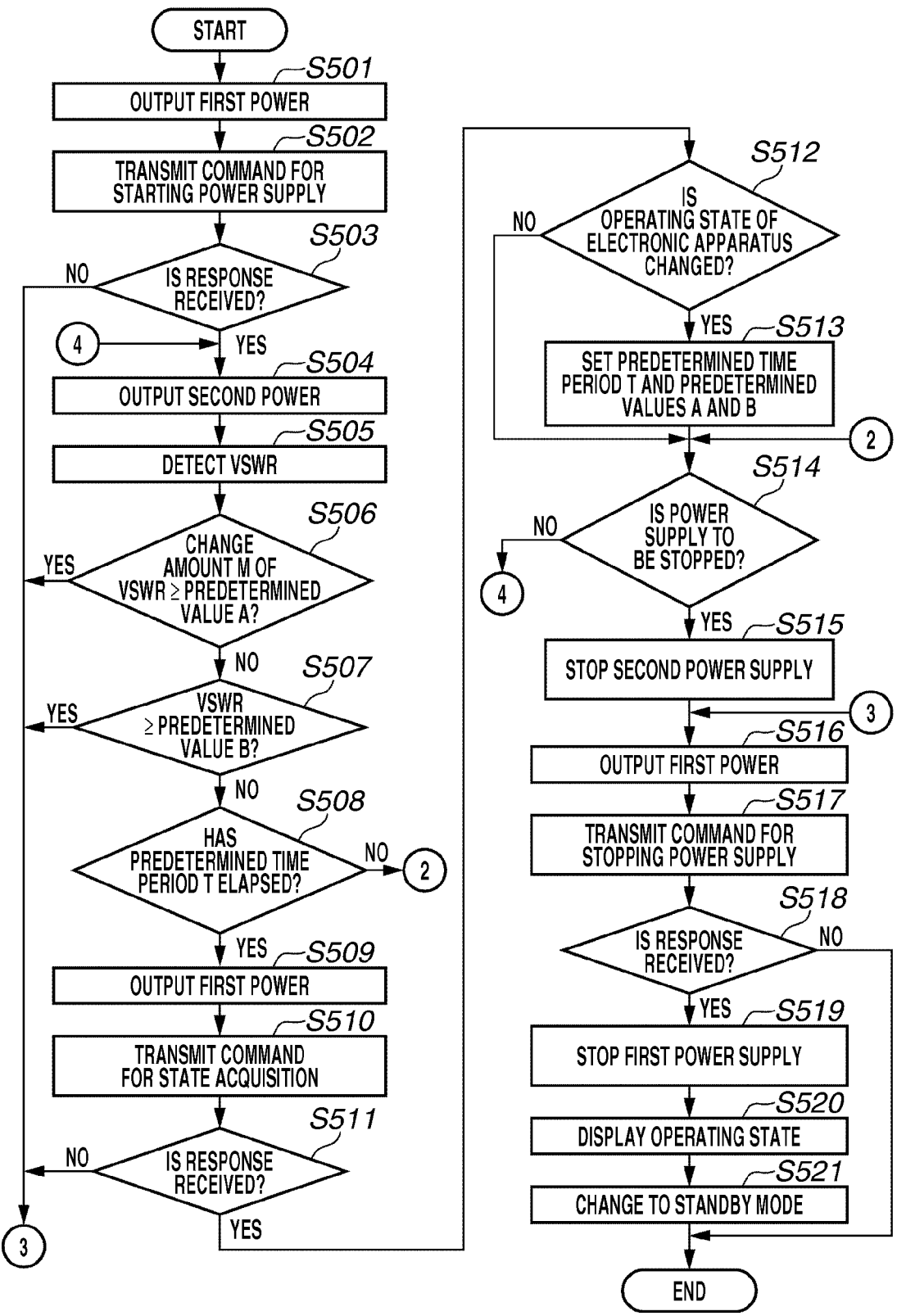
FIG. 5 is a flowchart illustrating exemplary power supply process performed by the power supply apparatus according to the first exemplary embodiment.

Even when the electronic apparatus 200 cannot transmit its status information to the power supply apparatus 100 until the electronic apparatus 200 receives the first command from the power supply apparatus 100, the power supply apparatus 100 can acquire the status information of the electronic apparatus 200 by performing the power supply process (FIG. 5).

Thus, in a power supply system according to the first exemplary embodiment, when a foreign object exists within the predetermined range of distance from the power supply apparatus 100, the power supply apparatus 100 can detect the foreign object.

In the case of first power supply to the electronic apparatus 200, when the change amount M of the VSWR is equal to or greater than the predetermined value A (YES in step S407), the power supply apparatus 100 determines that a foreign object exists within the predetermined range.

Thus, when the power supply apparatus 100 is supplying the first power to the electronic apparatus 200, even when a foreign object is placed within the predetermined range, the power supply apparatus 100 can detect the existence of the foreign object within the predetermined range.

In the case of first power supply to the electronic apparatus 200, even when the change amount M of the VSWR is smaller than the predetermined value A, when the VSWR is equal to or greater than the predetermined value B (YES in step S408), the power supply apparatus 100 determines that a foreign object exists within the predetermined range.

Thus, when the power supply apparatus 100 is supplying the first power to the electronic apparatus 200, even when a foreign object is placed within the predetermined range, the power supply apparatus 100 can detect the existence of the foreign object within the predetermined range.

In the case of first power supply to the electronic apparatus 200, when a time period elapsed since the predetermined values A and B were set has reached the predetermined time period T (YES in step S409), the power supply apparatus 100 acquires from the electronic apparatus 200 the predetermined values A and B and the predetermined time period T corresponding to the operating state of the electronic apparatus 200. In this case, even when the electronic apparatus 200 cannot transmit to the power supply apparatus 100 the predetermined values A and B and the predetermined time period T corresponding to the operating state of the electronic apparatus 200, the power supply apparatus 100 can acquire from the electronic apparatus 200 the predetermined values A value B and the predetermined time period T corresponding to the operating state of the electronic apparatus 200.

Thus, even when the VSWR detected by the power supply apparatus 100 changes accompanying the change in the operating state of the electronic apparatus 200, the power supply apparatus 100 can correctly detect whether a foreign object exists within the predetermined range. Since the power supply apparatus 100 sets, according to the operating state of the electronic apparatus 200, a period for acquiring the predetermined values A and B and the time period T corresponding to the operating state of the electronic apparatus 200 from the electronic apparatus 200, the power supply apparatus 100 can detect whether a foreign object exists within the predetermined range by using the exact predetermined values A and B and the predetermined time period T.

Therefore, even when the electronic apparatus 200 is in such an operating state where the VSWR detected by the power supply apparatus 100 largely changes, the power supply apparatus 100 does not detect a change amount of the VSWR corresponding to the operating state of the electronic apparatus 200 as a change amount of the VSWR due to the existence of a foreign object within the predetermined range. Therefore, in the case of first power supply to the electronic apparatus 200, the power supply apparatus 100 is capable of not incorrectly detecting the existence of a foreign object within the predetermined range although no foreign object exists within the predetermined range.

In the case of second power supply to the electronic apparatus 200, when the change amount M of the VSWR is equal to or greater than the predetermined value A (YES in step S506), the power supply apparatus 100 determines that a foreign object exists within the predetermined range.

Thus, when the power supply apparatus 100 is supplying the second power to the electronic apparatus 200, even when a foreign object is placed within the predetermined range, the power supply apparatus 100 can detect the existence of the foreign object within the predetermined range.

In the case of second power supply to the electronic apparatus 200, even when the change amount M of the VSWR is smaller than the predetermined value A, when the VSWR is equal to or greater than the predetermined value B (YES in step S507), the power supply apparatus 100 determines that a foreign object exists within the predetermined range.

Thus, when the power supply apparatus 100 is supplying the second power to the electronic apparatus 200, even when a foreign object is placed within the predetermined range, the power supply apparatus 100 can detect the existence of the foreign object within the predetermined range.

In the case of second power supply to the electronic apparatus 200, when the time period elapsed since the predetermined values A and B were set has reached the predetermined time period T (YES in step S508), the power supply apparatus 100 reacquires from the electronic apparatus 200 the predetermined values A and B and the predetermined time period T corresponding to the operating state of the electronic apparatus 200. In this case, even when the electronic apparatus 200 cannot transmit to the power supply apparatus 100 the predetermined values A and B and the predetermined time period T corresponding to the operating state of the electronic apparatus 200, the power supply apparatus 100 can acquire from the electronic apparatus 200 the predetermined values A and B and the predetermined time period T corresponding to the operating state of the electronic apparatus 200.

Thus, even when the VSWR detected by the power supply apparatus 100 changes accompanying the change in the operating state of the electronic apparatus 200, the power supply apparatus 100 can correctly detect whether a foreign object exists within the predetermined range. Since the power supply apparatus 100 sets, according to the operating state of the electronic apparatus 200, the period for acquiring the predetermined values A and B and the time period T from the electronic apparatus 200, the power supply apparatus 100 can detect whether a foreign object exists within the predetermined range by using the exact predetermined values A and B and the predetermined time period T.

Therefore, even when the electronic apparatus 200 is in such an operating state where the VSWR detected by the power supply apparatus 100 largely changes, the power supply apparatus 100 does not detect a change amount of the VSWR corresponding to the operating state of the electronic apparatus 200 as a change amount of the VSWR due to the existence of a foreign object within the predetermined range. Therefore, in the case of second power supply to the electronic apparatus 200, the power supply apparatus 100 is capable of not incorrectly detecting the existence of a foreign object within the predetermined range although no foreign object exists within the predetermined range.

The power supply apparatus 100 according to the first exemplary embodiment can detect whether a foreign object exists within the predetermined range based on at least either one of the process for detecting a foreign object according to a change amount of the VSWR and the process for detecting a foreign object according to the value of the current VSWR.

Therefore, when the power supply apparatus 100 is supplying the first power to the electronic apparatus 200 and detects the existence of a foreign object within the predetermined range, the power supply apparatus 100 can stop power supply to the foreign object. In the case of first power supply to the electronic apparatus 200, when the power supply apparatus 100 detects that no foreign object exists within the predetermined range, the power supply apparatus 100 can supply the second power to the electronic apparatus 200.

In the case of second power supply to the electronic apparatus 200, when the existence of a foreign object within the predetermined range is detected, the power supply apparatus 100 can stop second power output to the electronic apparatus 200 to prevent power supply to the foreign object. In the case of second power supply to the electronic apparatus 200, when the power supply apparatus 100 detects that no foreign object exists within the predetermined range, the power supply apparatus 100 can continue second power supply to the electronic apparatus 200.

Therefore, the power supply apparatus 100 can detect a foreign object and suitably supply the power depending on a result of the foreign object detection.

When a foreign object is detected, the power supply apparatus 100 controls the power currently being output to the outside so as to be lower than the current power value. When a foreign object is not detected, the power supply apparatus 100 may control the power currently being output to the outside so as to be equal to or greater than the current power value.

Although the CPU 105 compares the predetermined value A with the change amount M of the calculated VSWR in step S407, the predetermined value A may be detected by the CPU 105 based on the information acquired from the electronic apparatus 200.

In this case, the first table recorded on the ROM 206 of the electronic apparatus 200 is prerecorded on the ROM 106 of the power supply apparatus 100.

In this case, the CPU 105 acquires from the electronic apparatus 200 the information about the operating state of the electronic apparatus 200 and the information about the movement distance of the electronic apparatus 200. The CPU 105 may further detect the predetermined value A by using the information about the operating state of the electronic apparatus 200 acquired therefrom, the information about the movement distance of the electronic apparatus 200 acquired therefrom, and the first table recorded on the ROM 106.

Similar to the above-mentioned process in step S407, the predetermined value A used in step S506 may be detected based on the information acquired from the electronic apparatus 200 by the CPU 105. Also in this case, the CPU 105 may detect the predetermined value A by using the information about the operating state of the electronic apparatus 200 acquired therefrom, the information about the movement distance of the electronic apparatus 200 acquired therefrom, and the first table recorded on the ROM 106.

Although the CPU 105 compares the predetermined value B with the calculated VSWR in step S408, the predetermined value B may be detected by the CPU 105 based on the information acquired from the electronic apparatus 200.

In this case, the second table recorded on the ROM 206 of the electronic apparatus 200 is prerecorded on the ROM 106 of the power supply apparatus 100.

In this case, the CPU 105 acquires from the electronic apparatus 200 the information about the operating state of the electronic apparatus 200 and the information about the movement distance of the electronic apparatus 200. The CPU 105 may further detect the predetermined value B by using the information about the operating state of the electronic apparatus 200 acquired therefrom, the information about the movement distance of the electronic apparatus 200 acquired therefrom, and the second table recorded on the ROM 106.

Similar to the above-mentioned process in step S408, the predetermined value B used in step S507 may be detected based on the information acquired from the electronic apparatus 200 by the CPU 105. In this case, the CPU 105 may detect the predetermined value B by using the information about the operating state of the electronic apparatus 200 acquired therefrom, the information about the movement distance of the electronic apparatus 200 acquired therefrom, and the second table recorded on the ROM 106.

Although the CPU 105 determines whether the time period measured by the timer 109 has reached the predetermined time period T in step S409, the predetermined time period T may be detected by the CPU 105 based on the information acquired from the electronic apparatus 200.

In this case, the third table recorded on the ROM 206 of the electronic apparatus 200 is prerecorded on the ROM 106 of the power supply apparatus 100.

In this case, the CPU 105 acquires from the electronic apparatus 200 the information about the operating state of the electronic apparatus 200 and the information about the movement distance of the electronic apparatus 200. The CPU 105 may further detect the predetermined time period T by using the information about the operating state of the electronic apparatus 200 acquired therefrom, the information about the movement distance of the electronic apparatus 200 acquired therefrom, and the third table recorded on the ROM 106.

Similar to the above-mentioned process in step S409, the predetermined time period T used in step S508 may also be detected based on the information acquired from the electronic apparatus 200 by the CPU 105. In this case, the CPU 105 may detect the predetermined time period T by using the information about the operating state of the electronic apparatus 200 acquired therefrom, the information about the movement distance of the electronic apparatus 200 acquired therefrom, and the third table recorded on the ROM 106.

When the CPU 105 determines that the change amount M of the VSWR is smaller than the predetermined value A (NO in step S407), the CPU 105 determines whether a foreign object exists within the predetermined range by executing the process in step S408. However, the process is not limited thereto. For example, the CPU 105 may exchange the execution order of the process in step S407 and the process in step S408. When the CPU 105 exchanges the execution order of the process in step S407 and the process in step S408, when the CPU 105 determines that the VSWR detected by the CPU 105 in step S408 is smaller than the predetermined value B, the CPU 105 may execute the process in step S407.

When the CPU 105 determines that the VSWR detected in step S408 is smaller than the predetermined value B and that the change amount M of the VSWR is smaller than the predetermined value A, the CPU 105 executes the process in step S409. When the CPU 105 determines that the VSWR detected in step S408 is equal to or greater than the predetermined value B or that the change amount M of the VSWR is equal to or greater than the predetermined value A, the CPU 105 executes the process in steps S411 to S413.

Similarly, when the CPU 105 determines that the change amount M of the VSWR is smaller than the predetermined value A (NO in step S506), the CPU 105 determines whether a foreign object exists within the predetermined range by executing the process in step S507. However, the process is not limited thereto. For example, the CPU 105 may exchange the execution order of the process in step S506 and the process in step S507. When the CPU 105 exchanges the execution order of the process in step S506 and the process in step S507, when the CPU 105 determines that the VSWR detected by the CPU 105 in step S507 is smaller than the predetermined value B, the CPU 105 may execute the process in step S506.

When the CPU 105 determines that the VSWR detected in step S507 is smaller than the predetermined value B and that the change amount M of the VSWR is smaller than the predetermined value A, the CPU 105 executes the process in step S508. When the CPU 105 determines that the VSWR detected in step S507 is equal to or greater than the predetermined value B or that the change amount M of the VSWR is equal to or greater than the predetermined value A, the CPU 105 executes the process in steps S516 to S521.

The predetermined value A may be a value indicating a change amount of the VSWR per unit time. In this case, the CPU 105 detects the change amount M of the VSWR per unit time by dividing the change amount of the VSWR detected by the CPU 105 by the time period elapsed since the predetermined values A and B were set, measured by the timer 109. Thus, in step S407, the CPU 105 determines whether the change amount M of the VSWR per unit time is equal to or greater than the predetermined value A to enable detecting a foreign object. Similarly, in step S506, the CPU 105 determines whether the change amount M of the VSWR per unit time is equal to or greater than the predetermined value A to enable detecting a foreign object.

When the CPU 105 performs the power supply process (FIG. 5) and when a foreign object is not detected within the predetermined range, the power supply apparatus 100 continues second power supply to the electronic apparatus 200 until the predetermined time period T has elapsed. When the CPU 105 performs the power supply process (FIG. 5) and when a foreign object is not detected within the predetermined range, the power supply apparatus 100 transmits the first command to the electronic apparatus 200 when the predetermined time period T has elapsed. Thus, the power supply apparatus 100 supplies the first power from the second power to the electronic apparatus 200 to request the electronic apparatus 200 for the information about the electronic apparatus 200.

Accordingly, the longer the predetermined time period T set by the CPU 105, the more power the power supply apparatus 100 can supply to the electronic apparatus 200. The shorter the predetermined time period T set by the CPU 105, the less power the electronic apparatus 200 can supply to the electronic apparatus 200.

A second exemplary embodiment of the present invention will be described below. When the second exemplary embodiment has a similar configuration to that in the first exemplary embodiment, and when it performs similar process and operations to those in the first exemplary embodiment, duplicated explanations will be omitted.

Similar to the power supply system according to the first exemplary embodiment, a power supply system according to the second exemplary embodiment is as illustrated in FIG. 1.

When the power supply apparatus 100 according to the first exemplary embodiment acquires the status information from the electronic apparatus 200, the power supply 100 sets the predetermined time period T based on the acquired status information, and does not transmit the first command to the electronic apparatus 200 until the predetermined time period T has elapsed.

However, the power supply apparatus 100 according to the second exemplary embodiment sets the predetermined time period T according to the value of the power to be outputted from the power supply apparatus 100 to the electronic apparatus 200, and does not transmit the first command to the electronic apparatus 200 until the predetermined time period T has elapsed. Even when the status information of the electronic apparatus 200 acquired therefrom includes the predetermined time period T, the power supply apparatus 100 according to the second exemplary embodiment sets the predetermined time period T according to the power to be supplied from the power supply apparatus 100 to the electronic apparatus 200. Therefore, even when the operating state of the electronic apparatus 200 has been changed, when the power generated by the power transmission circuit 102 remains unchanged, the power supply apparatus 100 leaves the setting of the predetermined time period T unchanged.

A time table is prerecorded on the ROM 106 of the power supply apparatus 100 according to the second exemplary embodiment.

The time table indicates the correspondence between the power generated by the power transmission circuit 102 and the predetermined time period T. The power generated by the power transmission circuit 102 changes under the control of the CPU 105. When the power supply apparatus 100 transmits a command to the electronic apparatus 200, the CPU 105 controls the power transmission circuit 102 to generate the first power. When the power supply apparatus 100 performs the power supply process, the CPU 105 controls the power transmission circuit 102 to generate the second power. The CPU 105 sets values of the first and second power based on the power receiving information acquired from the electronic apparatus 200 and the status information of the electronic apparatus 200. The CPU 105 detects the value of the power generated by the power transmission circuit 102, and determines whether the value of the power generated by the power transmission circuit 102 has changed more than a predetermined value.

When the value of the power generated by the power transmission circuit 102 has changed more than the predetermined value, the CPU 105 detects the predetermined time period T by using the value of the power currently being generated by the power transmission circuit 102, and the time table.

In the second exemplary embodiment, when the CPU 105 performs the foreign object detection process (FIG. 4) that has been described in the first exemplary embodiment, duplicated explanations will be omitted. Only process different from that in the first exemplary embodiment will be described below.

In step S401, the CPU 105 controls the oscillator 101, the power transmission circuit 102, and the matching circuit 103 to supply the first power to the electronic apparatus 200. The CPU 105 further sets the predetermined time period T by using the first power and the time table. In step S401, the predetermined time period T set by the CPU 105 is recorded on the RAM 107. The CPU 105 controls the timer 109 to measure a time period elapsed since the predetermined time period T was set. The information about the time period measured by the timer 109 is recorded on the RAM 107. When the predetermined time period T is set, the process proceeds to step S402 from step S401.

In step S406, the CPU 105 sets the predetermined values A and B based on the status information of the electronic apparatus 200 acquired therefrom in step S404.

For example, when the status information of the electronic apparatus 200 acquired therefrom in step S404 includes the predetermined time period T and the predetermined values A1 and B1, the CPU 105 sets the predetermined value A to A1 and sets the predetermined value B to B1, but does not set the predetermined time period T to T1. When the CPU 105 sets the predetermined values A and B, the process proceeds to step S407 from step S406.

In step S409, the CPU 105 determines whether the time period measured by the timer 109 in step S401 has reached the predetermined time period T.

When the CPU 105 determines that the time period measured by the timer 109 has reached the predetermined time period T (YES in step S409), the CPU 105 determines that the predetermined time period T has elapsed, and the process returns to step S402 from step S409. In this case (YES in step S409), the CPU 105 further controls the timer 109 to stop time measurement.

When the CPU 105 determines that the time period measured by the timer 109 has not reached the predetermined time period T (NO in step S409), the CPU 105 determines that the predetermined time period T has not elapsed, and the process proceeds to step S410 from step S409. The predetermined time period T compared in step S409 with the time period measured by the timer 109 in step S401 is the time period set by the CPU 105 in step S401.

In the second exemplary embodiment, when the CPU 105 performs the power supply process (FIG. 5) that has been described in the first exemplary embodiment, duplicated explanations will be omitted. Only process different from that in the first exemplary embodiment will be described below.

In step S501, the CPU 105 controls the oscillator 101, the power transmission circuit 102, and the matching circuit 103 to supply the first power to the electronic apparatus 200. The CPU 105 further sets the predetermined time period T by using the first power and the time table. In step S501, the predetermined time period T set by the CPU 105 is recorded on the RAM 107. The CPU 105 controls the timer 109 to measure a time period elapsed since the predetermined time period T was set. The information about the time period measured by the timer 109 is recorded on the RAM 107. When the predetermined time period T is set, the process proceeds to step S502 from step S501.

In step S504, the CPU 105 controls the oscillator 101, the power transmission circuit 102, and the matching circuit 103 to supply the second power to the electronic apparatus 200 via the power supply antenna 108. The CPU 105 further sets the predetermined time period T by using the second power and the time table. In step S504, the predetermined time period T set by the CPU 105 is recorded on the RAM 107.

The CPU 105 controls the timer 109 to reset the time period measured by the timer 109 in step S501 and measure a time period elapsed since the predetermined time period T was set in step S504. The information about the time period measured by the timer 109 is recorded on the RAM 107. When the predetermined time period T is set by the CPU 105, the process proceeds to step S505 from step S504.

The predetermined time period T set by the CPU 105 according to the value of the second power and the time table in step S504 is shorter than the predetermined time period T set by the CPU 105 according to the value of the first power and the time table in step S501. Thus, when the power supply apparatus 100 is supplying the second power to the electronic apparatus 200, the CPU 105 acquires the status information of the electronic apparatus 200 therefrom by transmitting the first command to the electronic apparatus 200 more frequently than the case where the power supply apparatus 100 is supplying the first power to the electronic apparatus 200.

The larger the power supplied from the power supply apparatus 100 to the electronic apparatus 200, the shorter the predetermined time period T set by the CPU 105 to enable more frequently acquiring the status information from the electronic apparatus 200.

In step S508, the CPU 105 determines whether the time period measured by the timer 109 in step S501 has reached the predetermined time period T.

When the CPU 105 determines that the time period measured by the timer 109 has reached the predetermined time period T (YES in step S508), the CPU 105 determines that the predetermined time period T has elapsed, and the process proceeds to step S509 from step S508. In this case (YES in step S508), the CPU 105 controls the timer 109 to stop time measurement.

When the CPU 105 determines that the time period measured by the timer 109 has not reached the predetermined time period T (NO in step S508), the CPU 105 determines that the predetermined time period T has not elapsed, and the process proceeds to step S514 from step S508.

When executing again the process in step S504 when the time period measured by the timer 109 has not reached the predetermined time period T, the CPU 105 determines whether the value of the second power has changed more than a predetermined value. When the CPU 105 determines that the value of the second power has changed more than the predetermined value, the CPU 105 resets the predetermined time period T according to the second power and the time table. When resetting the predetermined time period T, the CPU 105 controls the timer 109 to once reset the time period measured by the timer 109 and measure again a time period elapsed since the predetermined time period T was set in step S504.

In step S513, the CPU 105 sets the predetermined values A and B based on the status information of the electronic apparatus 200 acquired therefrom in step S511. Also in this case, the CPU 105 does not set the predetermined time period T based on the status information of the electronic apparatus 200 acquired therefrom in step S511. When the predetermined values A and B are set by the CPU 105, the process proceeds to step S514 from step S513.

In step S516, the CPU 105 sets the power to be supplied to the electronic apparatus 200 as the first power, and controls the oscillator 101, the power transmission circuit 102, and the matching circuit 103 to supply the first power to the electronic apparatus 200 via the power supply antenna 108.

In this case, the CPU 105 further sets the predetermined time period T by using the first power and the time table. In step S516, the predetermined time period T set by the CPU 105 is recorded on the RAM 107. The CPU 105 controls the timer 109 to reset the time period measured by the timer 109 and measure a time period elapsed since the predetermined time period T was set in step S516. The information about the time period measured by the timer 109 is recorded on the RAM 107. When the predetermined time period T is set, the process proceeds to step S517 from step S516.

In the second exemplary embodiment, when the CPU 105 performs the status information acquisition process (FIG. 6) that has been described in the first exemplary embodiment, duplicated explanations will be omitted. Only process different from that in the first exemplary embodiment will be described below.

In step S604, the CPU 105 sets the predetermined values A and B based on the status information of the electronic apparatus 200 acquired therefrom in step S602.

For example, when the status information of the electronic apparatus 200 acquired therefrom in step S602 includes the predetermined time period T3 and the predetermined values A3 and B3, the CPU 105 sets the predetermined value A to A3 and sets the predetermined value B to B3, but does not set the predetermined time period T to T3. When the predetermined values A and B are set by the CPU 105, the process ends.

In the case of first power supply to the electronic apparatus 200, when a time period elapsed since first power supply to the electronic apparatus 200 was started has reached the predetermined time period T (YES in step S409), the power supply apparatus 100 according to the second exemplary embodiment reacquires the predetermined values A and B from the electronic apparatus 200.

In this case, the power supply apparatus 100 sets a time period for acquiring from the electronic apparatus 200 the predetermined values A and B corresponding to the operating state of the electronic apparatus 200 according to the first power supplied thereto.

In the case of second power supply to the electronic apparatus 200, when a time period elapsed since second power supply to the electronic apparatus 200 was started has reached the predetermined time period T (YES in step S508), the power supply apparatus 100 reacquires from the electronic apparatus 200 the predetermined values A and B corresponding to the operating state of the electronic apparatus 200.

In this case, the power supply apparatus 100 sets a time period for acquiring from the electronic apparatus 200 the predetermined values A and B corresponding to the operating state of the electronic apparatus 200 according to the second power supplied thereto.

Accordingly, when the power supply apparatus 100 supplies the second power to the electronic apparatus 200, the power supply apparatus 100 sets the shorter predetermined time period T than that in the case of first power supply to the electronic apparatus 200. Thus, the larger the power supplied from the power supply apparatus 100 to the electronic apparatus 200, the more frequently the predetermined values A and B corresponding to the operating state of the electronic apparatus 200 can be acquired therefrom.

Therefore, the power supply apparatus 100 can detect whether a foreign object exists within the predetermined range by using the exact predetermined values A and B acquired from the electronic apparatus 200.

Therefore, the power supply apparatus 100 can detect a foreign object and perform suitable power supply depending on a result of the foreign object detection.

In the second exemplary embodiment, when the power supply apparatus 100 performs process which is common to process in the first exemplary embodiment, a similar effect to that in the first exemplary embodiment can be acquired.

In the first exemplary embodiment, the power supply apparatus 100 sets the predetermined time period T, a time period for not acquiring the status information of the electronic apparatus 200, based on the status information of the electronic apparatus 200 acquired therefrom. In the second exemplary embodiment, the power supply apparatus 100 sets the predetermined time period T, a time period for not acquiring the status information of the electronic apparatus 200, according to the power to be supplied to the electronic apparatus 200.

However, the power supply apparatus 100 may selectively change between the process for setting the predetermined time T as in the first exemplary embodiment and the process for setting the predetermined time T as in the second exemplary embodiment. For example, when the power supply apparatus 100 is supplying the power below 5 W to the electronic apparatus 200, the predetermined time period T can be set based on the status information of the electronic apparatus 200 as in the first exemplary embodiment. When the power supply apparatus 100 is supplying the power equal to or greater than 5 W to the electronic apparatus 200, the predetermined time period T can be set according to the power supplied from the power supply apparatus 100 to the electronic apparatus 200 as in the second exemplary embodiment.

Thus, when the power supply apparatus 100 selectively changes the process for setting the predetermined time period T as mentioned above, the power supply apparatus 100 periodically detects the power generated by the power transmission circuit 102. In this case, the power supply apparatus 100 determines whether the power generated by the power transmission circuit 102 is equal to or greater than a predetermined power value. When the power generated by the power transmission circuit 102 is equal to or greater than the predetermined power value, the power supply apparatus 100 sets the predetermined time period T according to the power supplied from the power supply apparatus 100 to the electronic apparatus 200 as in the second exemplary embodiment. When the power generated by the power transmission circuit 102 is smaller than the predetermined power value, the power supply apparatus 100 sets the predetermined time period T based on the status information of the electronic apparatus 200 acquired therefrom as in the first exemplary embodiment. The predetermined power value may be other than 5 W.

The power supply apparatus 100 according to the present invention is not limited to the power supply apparatus 100 described in the first exemplary embodiment. Further, the electronic apparatus 200 according to the present invention is not limited to the electronic apparatus 200 described in the first exemplary embodiment. For example, the power supply apparatus 100 and the electronic apparatus 200 according to the present invention can also be implemented by a system composed of a plurality of apparatuses.

Various pieces of processing and functions described in the first exemplary embodiment can also be implemented by a computer program. In this case, the computer program according to the present invention can be executed by a computer (including a CPU) to implement various functions described in the first exemplary embodiment.

The computer program according to the present invention may implement various pieces of processing and functions described in the first exemplary embodiment by utilizing an operating system (OS) operating on the computer.

The computer program according to the present invention is read from a computer-readable recording medium (storage medium) and then executed by the computer. The computer-readable recording medium may be a hard disk drive, an optical disc, a CD-ROM, a CD-R, a memory card, a ROM, and so on. The computer program according to the present invention may be distributed from an external apparatus to the computer via a communication interface and then executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-036024 filed Feb. 22, 2011, which is hereby incorporated by reference herein in its entirety.

What is claimed is:

1. A power output apparatus comprising:
   an output unit that wirelessly outputs power to an electronic apparatus;
   a detection unit that detects a value relating to a traveling wave of power output by the output unit and a reflected wave of power output by the output unit; and
   a control unit performs at least one of a first process and a second process, wherein the first process includes a process for determining whether a change of a value detected by the detection unit is not less than a first predetermined value, wherein the second process includes a process for determining whether a value detected by the detection unit is not less than a second predetermined value, and wherein the control unit causes the output unit to output charging power for causing the electronic apparatus to charge a battery if a change of a value detected by the detection unit is less than the first predetermined value and a value detected by the detection unit is less than the second predetermined value.

2. The power output apparatus according to claim 1, wherein the control unit controls so that power outputted by the output unit is greater than or equal to a predetermined value if a predetermined object is not detected.

3. The power output apparatus according to claim 1, wherein the first predetermined value and the second predetermined value are set based on an operating status of the electronic apparatus or a movement distance of the electronic apparatus.

4. The power output apparatus according to claim 1, wherein the control unit changes the first predetermined value and the second predetermined value if a status of the electronic apparatus is changed.

5. The power output apparatus according to claim 1, wherein a value relating to a traveling wave of power output by the output unit and a reflected wave of power output by the output unit is a value indicating a voltage standing wave ratio (VSWR).

6. The power output apparatus according to claim 1, wherein the control unit performs a process for restricting power output from the output unit if a change of a value detected by the detection unit is not less than the first predetermined value.

7. The power output apparatus according to claim 1, wherein the control unit performs a process for restricting power output from the output unit if a value detected by the detection unit is not less than the second predetermined value.

8. The power output apparatus according to claim 1, wherein the control unit performs a process for informing an existence of a foreign object if a change of a value detected by the detection unit is not less than the first predetermined value.

9. The power output apparatus according to claim 1, wherein the control unit performs a process for informing an existence of a foreign object if a value detected by the detection unit is not less than the second predetermined value.

10. The power output apparatus according to claim 1, further comprising a communication unit that obtains status information relating to a status of the electronic apparatus from the electronic apparatus, wherein the control unit controls, according to a status of the electronic apparatus, a timing of causing the communication unit to obtain next the status information from the electronic apparatus.

11. The power output apparatus according to claim 10, wherein the control unit sets, according to the status information obtained by the communication unit, the first predetermined value and the second predetermined value.

12. A method for controlling a power output apparatus, the method comprising:
   detecting a value relating to a traveling wave of power output by the power output apparatus and a reflected wave of power output by the power output apparatus;
   performing at least one of a first process and a second process, wherein the first process includes a process for determining whether a change of a detected value is not less than a first predetermined value, and wherein the second process includes a process for determining whether a detected value is not less than a second predetermined value; and outputting charging power for causing an electronic apparatus to charge a battery if a change of a detected value is less than the first predetermined value and a detected value is less than the second predetermined value.

13. The method according to claim 12, wherein a value relating to a traveling wave of power output by the power output apparatus and a reflected wave of power output by the power output apparatus is a value indicating a voltage standing wave ratio (VSWR).

14. The method according to claim 12, further comprising performing a process for restricting power output from the power output apparatus if a change of a detected value is not less than the first predetermined value.

15. The method according to claim 12, further comprising performing a process for restricting power output from the power output apparatus if a detected value is not less than the second predetermined value.

16. The method according to claim 12, further comprising performing a process for informing an existence of a foreign object if a change of a detected value is not less than the first predetermined value.

17. The method according to claim 12, further comprising performing a process for informing an existence of a foreign object if a detected value is not less than the second predetermined value.

18. The method according to claim 12, further comprising obtaining status information relating to a status of the electronic apparatus from the electronic apparatus; and controlling, according to a status of the electronic apparatus, a timing of obtaining next the status information from the electronic apparatus.

19. The method according to claim 18, further comprising setting, according to the status information obtained from the electronic apparatus, the first predetermined value and the second predetermined value.

20. A non-transitory computer-readable storage medium storing a program that causes a computer to perform a method for controlling a power output apparatus, the method comprising:

detecting a value relating to a traveling wave of power output by the power output apparatus and a reflected wave of power output by the power output apparatus;

performing at least one of a first process and a second process, wherein the first process includes a process for determining whether a change of a detected value is not less than a first predetermined value, and wherein the second process includes a process for determining whether a detected value is not less than a second predetermined value; and outputting charging power for causing an electronic apparatus to charge a battery if a change of a detected value is less than the first predetermined value and a detected value is less than the second predetermined value.

* * * * *